US012592240B2

(12) United States Patent
Herre et al.

(10) Patent No.: US 12,592,240 B2
(45) Date of Patent: Mar. 31, 2026

(54) ENCODING AND DECODING OF ACOUSTIC ENVIRONMENT

(71) Applicant: Fraunhofer-Gesellschaft zur Förderung der angewandten Forschung e.V., Munich (DE)

(72) Inventors: Jürgen Herre, Erlangen (DE); Florin Ghido, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 94 days.

(21) Appl. No.: 18/515,502

(22) Filed: Nov. 21, 2023

(65) Prior Publication Data

US 2024/0087582 A1 Mar. 14, 2024

Related U.S. Application Data

(63) Continuation of application No. PCT/EP2022/064327, filed on May 25, 2022.

(30) Foreign Application Priority Data

May 27, 2021 (EP) .................................... 21176345

(51) Int. Cl.
*G10L 19/022* (2013.01)

(52) U.S. Cl.
CPC .................................. *G10L 19/022* (2013.01)

(58) Field of Classification Search
CPC .... G10L 19/022; G10L 19/008; G10L 19/167
See application file for complete search history.

(56) References Cited

U.S. PATENT DOCUMENTS 6,275,239 B1 * 8/2001 Ezer .......................... G06T 1/20 345/473
7,979,282 B2 * 7/2011 Kim ...................... G10L 19/008 704/500

(Continued)

FOREIGN PATENT DOCUMENTS

RU 2460155 C2 8/2012
RU 2551797 C2 5/2015

(Continued)

OTHER PUBLICATIONS

Office Action dated Jan. 22, 2025, issued in application No. CA 3220254.

(Continued)

*Primary Examiner* — Michael Colucci
(74) *Attorney, Agent, or Firm* — McClure, Qualey & Rodack, LLP

(57) ABSTRACT

There are disclosed apparatus and methods for encoding and decoding of acoustic environment. In accordance with an example, there is provided an apparatus for decoding an acoustic environment, the acoustic environment including at least one audio source and at least one audio object, the at least one audio object being represented by a structural-acoustic data which links positional data of polygons with acoustic properties of acoustic materials, wherein the positional data includes, for each polygon, the position of the vertexes, the apparatus comprising a bitstream reader for reading, from the bitstream, an encoded version of structural-acoustic data and at least one audio stream to be rendered as generated by the at least one audio source in the acoustic environment. An audio source decoding block to decode the at least one an audio stream representing the at least one audio source. A structural-acoustic data decoding block to decode the structural-acoustic data.

26 Claims, 13 Drawing Sheets

(56) References Cited

U.S. PATENT DOCUMENTS

| | | | | |
|---|---|---|---|---|
| 10,397,725 | B1 * | 8/2019 | Bharitkar | H04S 7/301 |
| 11,146,903 | B2 * | 10/2021 | Sen | H04S 7/30 |
| 2009/0326960 | A1 | 12/2009 | Breebaart | |
| 2010/0299145 | A1 | 11/2010 | Nakadai | |
| 2016/0111096 | A1 * | 4/2016 | Oh | H04S 7/308 381/22 |
| 2016/0255453 | A1 * | 9/2016 | Fueg | H04S 7/30 381/1 |
| 2020/0099891 | A1 * | 3/2020 | Valli | H04N 13/111 |
| 2020/0227052 | A1 | 7/2020 | Breebaart | |
| 2020/0335112 | A1 | 10/2020 | Breebaart | |
| 2021/0279749 | A1 * | 9/2021 | Breunig | H04W 4/021 |
| 2024/0087582 | A1 | 3/2024 | Herre | |

FOREIGN PATENT DOCUMENTS

| | | | |
|---|---|---|---|
| WO | 2019197404 | A1 | 10/2019 |
| WO | 202224862 | A1 | 2/2022 |
| WO | 2022248620 | A1 | 12/2022 |

OTHER PUBLICATIONS

International Search Report and Written Opinion dated Sep. 23, 2022, issued in application No. PCT/EP2022/064327.

"MPEG-I (Introductory element—Main element—Part #: Audio);" SO 23090-4:202#(X) ISO/IEC JTC 1/SC 29/WG 6; 2022; pp. 1-273.

"MPEG-I 6DoF Audio Encoder Input Format;" ISO/IEC JTC I/SC 29/WG N19211; 130. MPEG Meeting; Apr. 2020; pp. 1-32.

Russian language Notice of Allowance dated May 30, 2024, issued in application No. RU 2023135085.

English language translation of Notice of Allowance dated May 30, 2024 (pp. 1-10 of attachment).

Japanese language office action dated Mar. 6, 2025, issued in application No. JP 2023-572773 (English language translation pp. 1-6 of attachment).

"MPEG-I Immersive Audio Encoder Input Format" ISO/IEC JTC 1/SC 29/WG; Apr. 2021; pp. 1-36 https://www.mpeg.org/wpcontent/uploads/mpeg_meetings/134_OnLine/w20446.zip.

Indian language office action (with English language translation) dated Jan. 14, 2026, issued in application No. IN 202337079952.

Schuyler Quackenbush Audio Research Labs; "ISO/IEC ISO/IEC 23090-4 MPEG-I Immersive Audio;" pp. 1-22 https://mpeg.chiariglione.org/sites/default/files/events/3.%20MPEG-AudioPresentation.pdf.

"MPEG-I Immersive Audio Encoder Input Format;" ISO/IEC JTC 1/SC 29/WG 6; Apr. 2021; pp. 1-4.

* cited by examiner encode_unform arithmetically encodes a value where idx is the index of the character in the alphabet and where alph is the size of the entire alphabet. The binary output is variable in length because it is a fractional number between 0 and 1 in binary. The distribution is assumed to be uniform Encode_MTF (idx, alph)

0 → 0b0

1 → 0b10

2 → 0b110

3 → 0b1110

4 → 0b11110

5 → 0b111110

6 → 0b1111110

7 → 0b11111110

8 → 0b11111111 encode_unform (idx – 8, alph – 8)

FIG 10h

ENCODING AND DECODING OF ACOUSTIC ENVIRONMENT

CROSS-REFERENCE TO RELATED APPLICATIONS

This application is a continuation of copending International Application No. PCT/EP2022/064327, filed May 25, 2022, which is incorporated herein by reference in its entirety, and additionally claims priority from European Application No. EP 21176345.3, filed May 27, 2021, which is also incorporated herein by reference in its entirety.

There are disclosed apparatus and methods for encoding and decoding of acoustic environment.

BACKGROUND OF THE INVENTION

Triangle mesh data is an important component of a virtual acoustic environment. The mesh is composed of a list of vertexes and a list of triangle faces. Each vertex is a point in 3D space, localized by its X, Y, and Z coordinates, and has an associated index in the vertex list. Each triangle identifies a simple surface, and contains three vertex indexes, and an associated acoustic material. The vertex indexes for a triangle are listed in a particular order, which defines the outside pointing normal of the simple surface.

There are many interchange and compression formats for generic triangle mesh data. However, they are usually intended for coding visual triangle mesh data, typically of objects and environments. In contrast, mesh triangle data for virtual acoustic environments and objects have several particular properties. For example, the mesh data usually contains only the acoustically relevant surfaces of enough size. A significant number of object surfaces are located on a small number of planes, or have a layered structure. Surfaces that do not contain an acoustic material are invisible for acoustic purposes and can be discarded. There may also be coordinate symmetries generated by the fact that objects with regular shapes are using a relative coordinate system centered in their apparent center of gravity. All these additional properties may be used for a more efficient and at the same time low complexity custom coding scheme.

SUMMARY

According to an embodiment, an apparatus for decoding an acoustic environment, the acoustic environment including at least one audio source and at least one audio object, the at least one audio object being represented by a structural-acoustic data which links positional data of polygons with acoustic properties of acoustic materials, wherein the positional data includes, for each polygon, the position of the vertexes, may have: a bitstream reader for reading, from the bitstream, an encoded version of structural-acoustic data and at least one audio stream to be rendered as generated by the at least one audio source in the acoustic environment; an audio source decoding block to decode the at least one audio stream representing the at least one audio source; a structural-acoustic data decoding block to decode the structural-acoustic data, wherein the structural-acoustic data decoding block uses, for at least one dimension, an ordered shortlist, in which coordinate values of previously decoded vertexes are stored according to an order, wherein the structural-acoustic data decoding block is configured, in case the bitstream has encoded therein an ordinal value of the ordered shortlist, to reconstruct the coordinate value as the value stored in the ordered shortlist associated with the ordinal value.

According to another embodiment, a method for decoding an acoustic environment, the acoustic environment including at least one audio source and at least one audio object, the at least one audio object being represented by a structural-acoustic data list which links positional data of polygons onto structural-acoustic properties of materials, wherein the positional data includes, for each polygon, the position of one primary structural-acoustic vertex and the position of the remaining structural-acoustic vertexes, may have the steps of: reading, from the bitstream, an encoded version of structural-acoustic data and at least one audio stream to be rendered as generated by the at least one audio source in the acoustic environment; decoding the at least one audio stream; and decoding the structural-acoustic data, the method using, for at least one dimension, an ordered shortlist, in which coordinate values of previously decoded vertexes are stored according to an order, wherein, in case the bitstream has encoded therein an ordinal value of the ordered shortlist, to reconstruct the coordinate value as the value stored in the ordered shortlist associated with the ordinal value.

In accordance to an example, there is provided an apparatus for decoding an acoustic environment, the acoustic environment including at least one audio source and at least one audio object, the at least one audio object being represented by a structural-acoustic data which links positional data of polygons with acoustic properties of acoustic materials, wherein the positional data includes, for each polygon, the position of the vertexes, the apparatus comprising:

- a bitstream reader for reading, from the bitstream, an encoded version of structural-acoustic data and at least one audio stream to be rendered as generated by the at least one audio source in the acoustic environment;
- an audio source decoding block to decode the at least one an audio stream representing the at least one audio source;
- a structural-acoustic data decoding block to decode the structural-acoustic data.

There is also provided an apparatus for encoding an acoustic environment, the acoustic environment including at least one audio source and at least one audio object, the at least one audio object being represented by at least one structural-acoustic data which links positional data of polygons with acoustic properties of acoustic materials, wherein the structural-acoustic data include, for each polygon, the position the vertexes, the apparatus comprising:

- an audio source encoding block configured to encode at least one audio stream to be rendered, the at least one audio stream being associated with the at least one audio source;
- a structural-acoustic data encoding block configured to encode at least one structural-acoustic data to obtain an encoded version of the at least one structural-acoustic data,
- a bitstream writer configured for writing, in a bitstream, the at least one audio stream and the encoded version) of the at least one structural-acoustic data.

There is also provided a method for encoding an acoustic environment, the acoustic environment including at least one audio source and at least one audio object, the at least one audio object being represented by at least one structural-acoustic data which links positional data of polygons onto structural-acoustic properties of materials, wherein the positional data include, for each polygon, the position of one primary polygonal vertex and the position of the remaining polygonal vertexes, the method comprising:

encoding at least one audio stream to be rendered in association with the at least one audio source;

encoding at least one structural-acoustic data to obtain an encoded version of the at least one structural-acoustic data, and writing, in a bitstream, the at least one audio stream and the encoded version of the at least one structural-acoustic data.

There is also provided a bitstream encoding audio information in which an acoustic environment is encoded, the acoustic environment including at least one audio source and at least one audio object, the at least one audio object being represented by at least one structural-acoustic data list which maps positional data of polygons onto acoustic materials, wherein the positional data include, for each polygon, the position of one vertex, the bitstream comprising:

at least one audio stream to be rendered;

an encoded version of the at least one structural-acoustic data.

There is also provided a non-transitory storage unit storing instructions which, when executed by a processor, cause the processor to control a decoding operation of an acoustic environment, the acoustic environment including at least one audio source and at least one audio object, the at least one audio object being represented by a structural-acoustic data list which links positional data of polygons onto structural-acoustic properties of materials, wherein the positional data includes, for each polygon, the position of one primary structural-acoustic vertex and the position of the remaining structural-acoustic vertexes, control a reading, from the bitstream, of an encoded version of structural-acoustic data and at least one audio stream to be rendered as generated by the at least one audio source in the acoustic environment;

control a decoding of the at least one an audio stream; and decoding the structural-acoustic data.

There is also provided a non-transitory storage unit storing instructions which, when executed by a processor, cause the processor to control a method encoding operation of an acoustic environment, the acoustic environment including at least one audio source and at least one audio object, the at least one audio object being represented by at least one structural-acoustic data which links positional data of polygons onto structural-acoustic properties of materials, wherein the positional data include, for each polygon, the position of one primary polygonal vertex and the position of the remaining polygonal vertexes, control an encoding of at least one audio stream to be rendered in association with the at least one audio source;

control an encoding of at least one structural-acoustic data to obtain an encoded version of the at least one structural-acoustic data, and control a writing, in a bitstream, of the at least one audio stream and the encoded version of the at least one structural-acoustic data.

BRIEF DESCRIPTION OF THE DRAWINGS

Embodiments of the present invention will be detailed subsequently referring to the appended drawings, in which:

FIGS. 10*a*-10*h* show a sequence of operation at the encoder.

DETAILED DESCRIPTION OF THE INVENTION

Encoder

Figure 1:
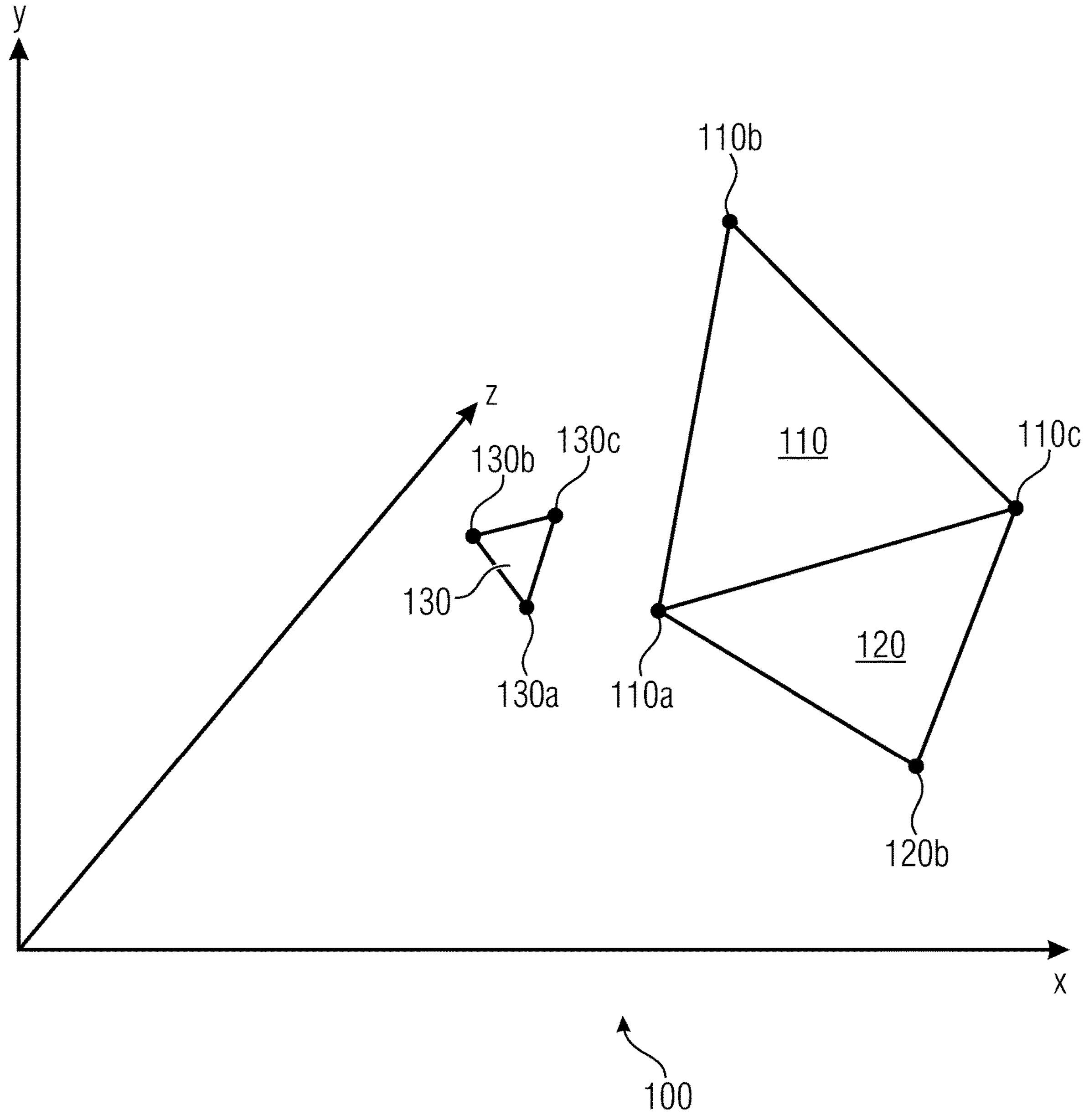
FIG. 1 shows an example of polygons (triangles) to be encoded/decoded.
Figure 2:
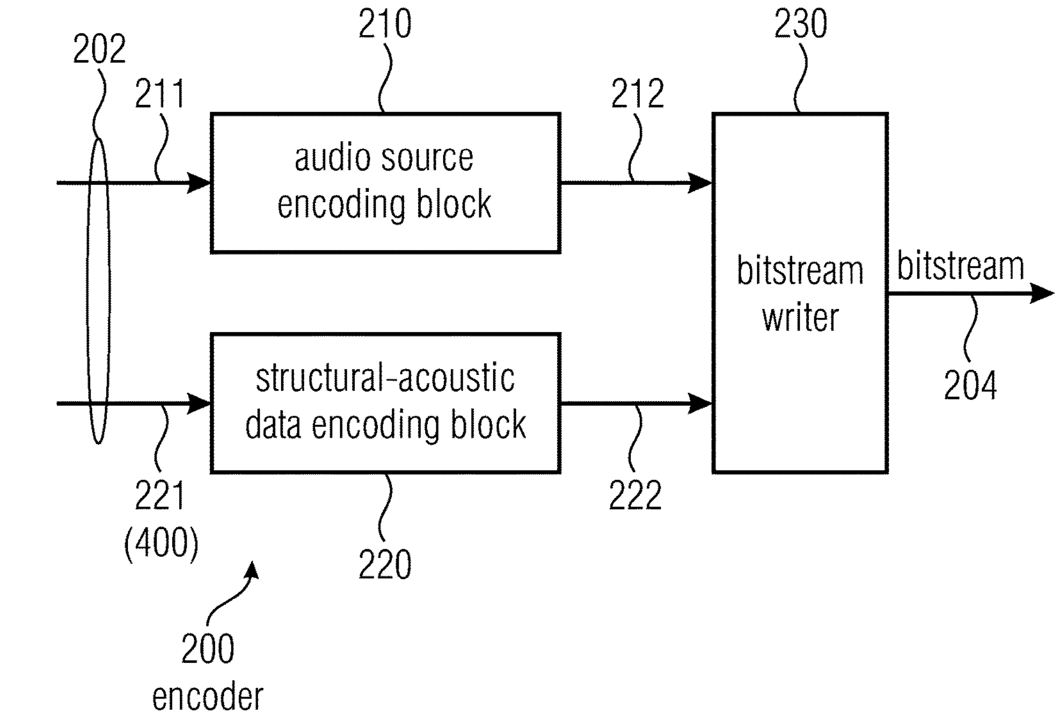
FIG. 2 shows an example of an apparatus for encoding an acoustic environment.

FIG. 2 shows an encoder 200 which may be understood as an apparatus for encoding an acoustic environment 202. The acoustic environment may be understood as a way of representing an audio signal 211 in a particular acoustic environment, to be encoded in a bitstream 204. The acoustic environment may be represented according to spatial coordinates. The acoustic environment may be represented according to a spatial coordinate system (e.g., x, y, z, such as in FIG. 1). The acoustic environment may include at least one audio source which is virtually located in some portions of the environment. The environment may be understood as a virtual environment, which is to be rendered at the highest fidelity possible. The encoder 200 may include an structural-acoustic data encoding block 220, which may link positional data of polygons with properties associated with acoustic materials. The polygons may be triangles. Each polygon (or more in particular triangle) may be represented as a term (triplet) of the vertexes. The output of the polygon data encoding block 222 may therefore be in principle represented by the triplet of structural-acoustic data and a value encoding the material. The polygons may therefore be surfaces of a voluminous material element, which have an influence on the behavior of the audio signal virtually generated by the audio source at the position indicated by the audio source. The encoder 200 may include a bitstream writer 230 to write the bitstream 204. Therefore, the audio sources which represents the audio signal virtually generated by them and their position in the environment 212 and the structural-acoustic data 222 representing the various materials in the environment can be encoded in the bitstream 204.

In general terms, the encoder 200 may be seen as an apparatus for encoding an acoustic environment, the acoustic environment including at least one audio source and at least one audio object, the at least one audio object being represented by at least one structural-acoustic data list which links positional data of polygons with acoustic properties of acoustic materials. The positional data may include, for each polygon, the position of one primary polygonal vertex (110*ax*, 110*ay*, 110*az*) and the position of the remaining polygonal vertexes (110*b*, 110*c*, 120*b*). The apparatus may comprise:

the audio source encoding block 210 configured to encode at least one audio stream to be rendered;

the structural-acoustic data encoding block 220 configured to encode a version (222) of the at least one structural-acoustic data (221); and a bitstream writer 230 configured for writing, in the bitstream 204, the at least one audio stream 212 and positional data, including the encoded versions of the structural-acoustic data.

Also the audio stream 212 is in general associated with audio source positional data, so that the audio source 211 represented by the audio stream 212 can correspond to determined positions in the acoustic environment in which they are virtually generated. In general terms, the at least one audio source, which is encoded in the bitstream 204 in association with the position in which it is virtually generated in the acoustic environment, is also encoded with side information providing its virtual position in the acoustic environment. Therefore, spatial data may also be encoded, as side information of the at least one audio stream 212, indicating positional relationships between the at least one audio source and the acoustic environment. Once decoded, the audio source will be rendered by keeping into account the spatial relationships between the audio source and the at least one audio object.

Decoder

Figure 3:
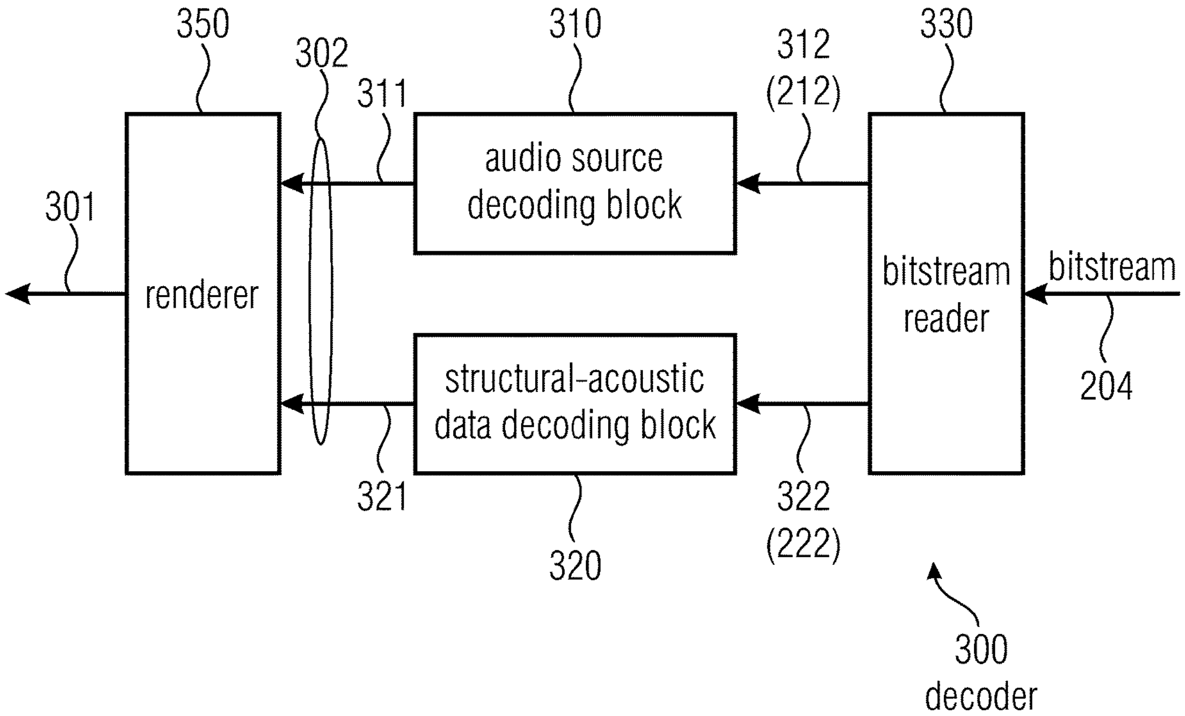
FIG. 3 shows an example of an apparatus for decoding an acoustic environment.

FIG. 3 shows a decoder 300 which operate to render the acoustic environment encoded in the bitstream 304. An audio signal 301 may therefore be generated by the decoder 300. Notwithstanding, the claimed decoder 300 may have, as an output, the acoustic environment 302 which is, possibly, the best representation of the original acoustic environment 202 to be represented by the renderer 350. The decoder 300 may include a bitstream reader 330 which may read the bitstream 204. The bitstream reader may therefore provide an encoded version 312 of the at least one audio source as encoded (as 212) by the audio source encoding block 210. The bitstream reader 330 may also provide an encoded version 322 of the structural-acoustic data 222 as encoded by the structural-acoustic data encoding block 220. The audio source decoding block 310 may provide a decoded version 311 of the original audio source 211. The structural-acoustic data decoding block 320 may provide a decoded version 321 of the original structural-acoustic data 221. The decoded version 311 of the original audio source 211 and the decoded version 321 of the original structural-acoustic data 221 may therefore be collectively considered a decoded version 302 of the environment 202.

The renderer 350 will receive the decoded environment 302 (including its components 311 and 321) to render the audio signal 301 as closest as possible to the original audio signal 202. In particular, the renderer 350 may represent the at least one audio source by keeping into account its position (e.g. virtual position) in the acoustic environment and the conditioning to which the sound is (virtually or in reality) subjected by virtue of the presence of the at least one audio object.

In general terms, the audio source, which is encoded in the bitstream 204 in association with the position in which it is virtually generated in the acoustic environment, is also encoded with side information providing its virtual position in the acoustic environment. Therefore the renderer 350 may represent the sound as being virtually generated in a particular location (e.g. indicated by the positional data of the audio source), under the effect of the presence (e.g. virtual presence) of the at least one audio object.

The decoder 300 may be an apparatus for decoding the acoustic environment 302, the acoustic environment 302 including at least one audio source and at least one audio object, the at least one audio object being represented by a structural-acoustic data list which links positional data of polygons with acoustic properties of acoustic materials. The positional data may include, for each polygon, the position of one primary structural-acoustic vertex and the position of the remaining structural-acoustic vertexes. The apparatus may comprise at least one of:

the bitstream reader 330 configured for reading, from the bitstream 204, the encoded version (322, 222) of the structural-acoustic data 211 and at least one audio stream 212 to be rendered as generated by the at least one audio source in the acoustic environment 302;

the audio source decoding block 310 to decode the at least one an audio stream (312, 212);

the structural-acoustic data decoding block 320 to decode the structural-acoustic data 211.

Structural-Acoustic Data

As shown in FIG. 1, an structural-acoustic data may be associated to polygons (or more in particular in thins example, triangles). The polygons may be polygons of a mesh. Here, there are shown three triangles 110, 120 and 130. The first triangle has a main vertex 110*a* and two remaining vertexes 110*b* and 110*c*. The second triangle 120 has a main vertex which is coincident with the main vertex 110*a* of the first triangle 110 (and is therefore indicated with the same reference sign), and two other remaining vertexes 120*b* (which is not coincident with another vertex of the first triangle 110) and 110*c* (which is coincident with another vertex of the first triangle 110). The third triangle 130 has a main vertex 130*a* and two remaining vertexes 130*b* and 130*c*. In this case, the y coordinate of the main vertex 130*a* happens to be the same of the y coordinate of the vertex 110 of the first and second triangles.

Figure 7:
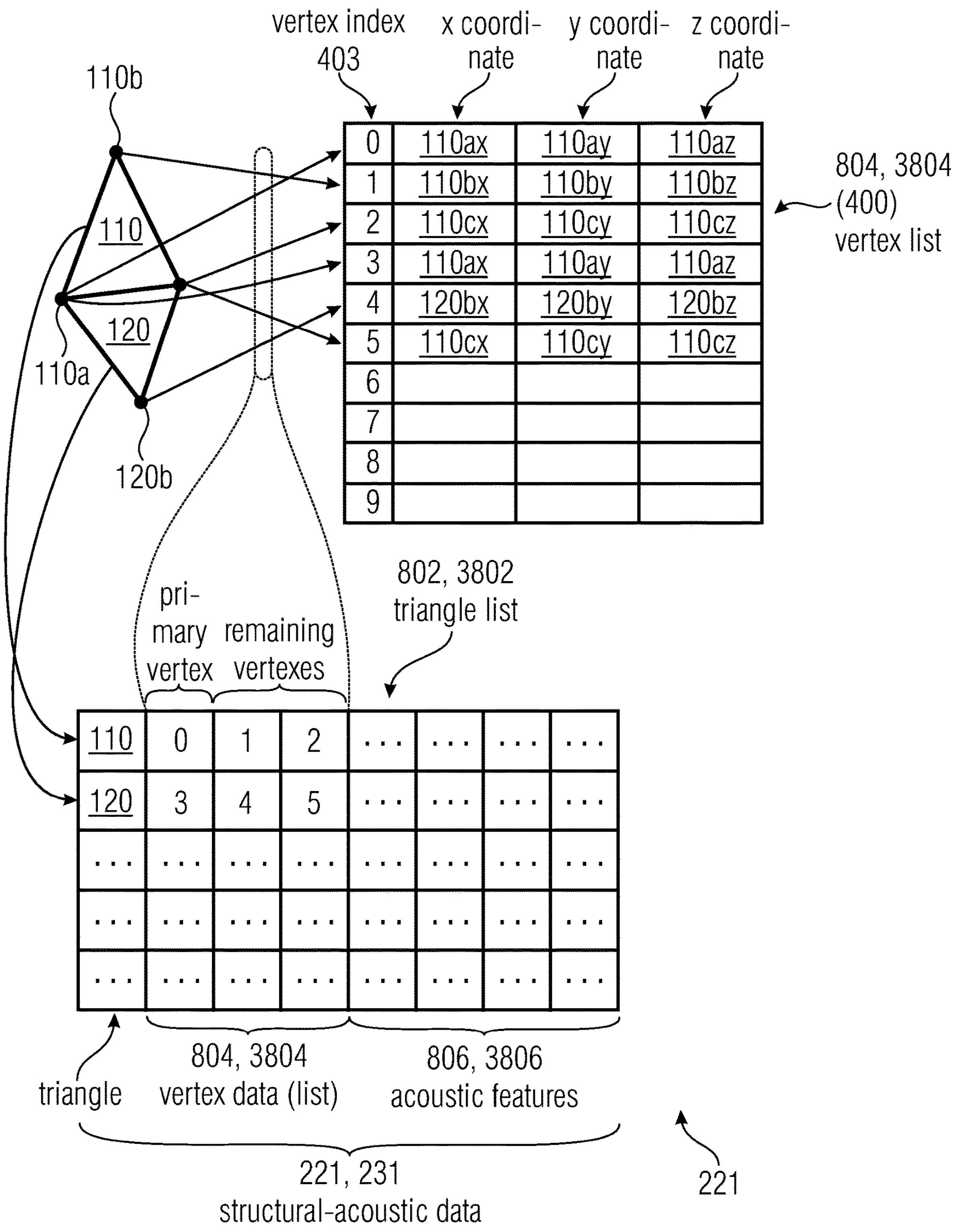
FIG. 7 shows an example of the data structures that can be used in the present examples.

FIG. 7 shows an example of how the structural-acoustic data can be understood. As can be seen, the triangles 110 and 120 with the vertexes 110*a*, 110*b*, 110*c* for the triangle 110*a*, 110*c* and 120*b* are shown (triangle 130 is not shown here). As can be seen, a first vertex list (804, 3804, 400) encompasses a vertex (e.g., 110*a*, 110*b*, 110*c*, 120*b*, etc.) in each record, in combination with its coordinates (x coordinate, y coordinate, z coordinate). Therefore, a link between each vertex index 403 in the vertex list and the coordinates of each vertex is stated (coordinate sings are represented with the addition of a "x", "y" or "z"). The vertex list (804, 3804, 400), therefore, associates a vertex index 403 to a triplet (or an n-tuple, according to the dimensions) of spatial coordinates, which identify the vertex position. In some cases, it is possible that some vertexes are repeated, by virtue of being vertexes coincident of different triangles (e.g., vertexes 110*a* and 11*c* are repeated, since they are coincident but in different triangles).

FIG. 7 also shows a triangle list (802, 3802) which links each triangle with the vertex indexes 403 of the triangle (or, more in general, the polygon). For example, associated with the triangle 110, we see that there are the vertex index 0 (associated to the coordinates of the vertex 110*a*), the vertex index 1 (associated to the vertex 110*b*), and the vertex index 2 (associated to the vertex 110*c*). In the triangle list (802, 3802), the triangle 120 is associated with the vertex indexes 3 (associated to the vertex 110*a*), 4 (associated to the triangle vertex 110*c*), and 5 (associated with the triangle vertex 120*b*). As can be seen, in the triangle list (802, 3802), together with the identification of the triangle and the vertex data mapping to the vertexes of the vertex list (and, subsequently, to the positions of the vertexes), there are also stored acoustic features (806, 3806), e.g., associated to the acoustic properties of the material.

Basically, FIG. 7 shows an example of structural-acoustic data (to be encoded) 221 which link triangles (110, 120, 130) and their positional data (e.g. coordinates of the vertexes) with acoustic properties of the materials. It will be shown that it is possible to compress these structural-acoustic data and to write them in the bitstream 204.

Figure 4:
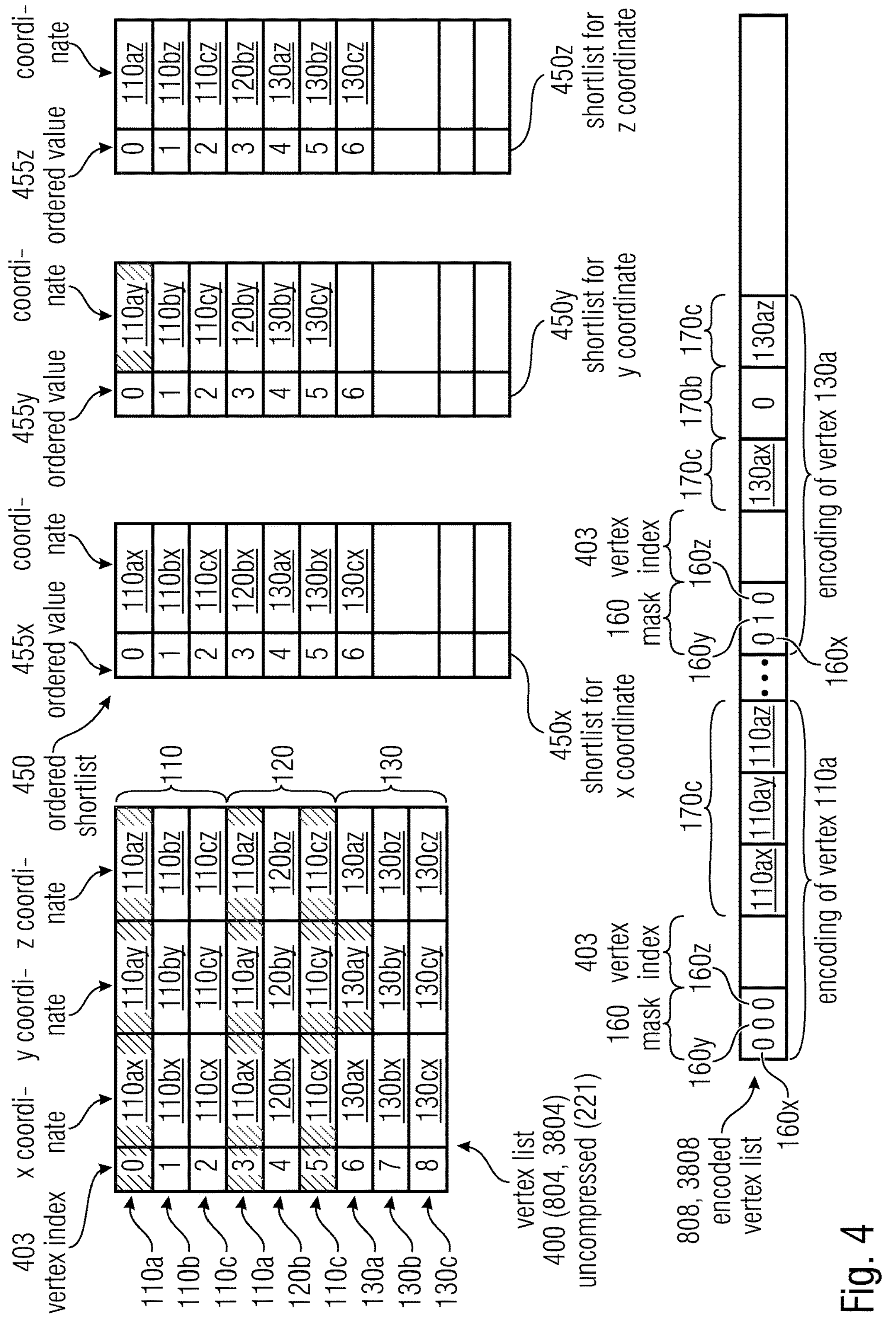
FIG. 4 shows an example of operation of encoding or decoding a vertex list.

FIG. 4 shows an example of the structural-acoustic data list 400 (which may be an example of the vertex list 400 (802, 3802) which lists, in different records, materials associated to the positional data of the primary vertex and the remaining vertexes of each of the triangles 110, 120. Here, the structural-acoustic data list 400 is shown as divided among the x coordinates (for the x dimension), y coordinates (for the y dimension), and z coordinates (for the z dimension). For example, in the x coordinates, the structural-acoustic data list 400 has stored therein, for the first triangle 110:

- an x coordinate 110*ax* of the primary vertex 110*a*; and
- the x coordinates 110*bx* and 110*cx* of the remaining vertexes 110*b* and 110*c*, respectively.

Analogously, in a corresponding record of the y coordinates of the structural-acoustic data list 400 (not shown in FIG. 4), a corresponding column of the primary vertex includes a y coordinate 110*ay* of the primary vertex 110*a*, while corresponding columns for the remaining vertexes have inserted y coordinates 110*by* and 110*cy* of the remaining vertexes 110*b* and 110*c*, respectively. The same applies to the z dimension: in a corresponding record of the z coordinates of the structural-acoustic data list 400 (not shown in FIG. 4), a corresponding column of the primary vertex includes a z coordinate 110*az* of the primary vertex 110*a*, while corresponding columns for the remaining vertexes 110*b* and 110*c* have inserted y coordinates 110*by* and 110*cy*, respectively.

In the second record (second horizontal row from above) of the structural-acoustic data list 400, the coordinates of the second triangle 120 are stored. It is possible to see that the coordinates of the primary vertex 110*ax* (but also 110*ay*, 110*az*) are repeated (for example, the x coordinate 110*ax* of the primary vertex 110*a* of the second triangle 120 repeats the same value stored for representing the primary vertex of the first triangle, despite the fact that these values are identical). The same applies to the vertex 110*c* whose coordinates 110*cx*, 110*cy*, 110*cz* are the same for the first triangle 110 and the second triangle 120.

Audio Source Encoding/Decoding

The audio source encoding block 210 and the audio source decoding block 210 are important elements of the encoder 200 and the decoder 300, respectively. The sound source to be encoded and decoded may be represented by the at least one audio stream 212, 312. Notwithstanding, it is not. The at least one sound source may be associated with positional data (e.g. metadata) which locate the position (e.g. virtual position) of the at least one sound source in the acoustic environment. Accordingly, the sound (audio signal) 301 may be rendered (e.g. by the renderer 350) based on the structural-acoustic relationships between the positional data of the at least one audio object, the acoustic properties of the materials (imagined as being the materials of the object), and the positional data of the at least one audio source. This operation may be performed by the renderer 350 at the decoder (which may be an external device).

For example, the at least one audio source may have positional data which include coordinates which permit to localize the at least one audio source in the acoustic environment, by taking into account the positional data of the at least one object (and in particular, the vertexes and the triangles) and the structural properties of the materials. The at least one audio source will therefore be localized in a particular position in the acoustic environment, and the listener will experience the sound as coming from that position and under the effect of the properties of the materials.

When it is referred to acoustic environment, therefore, reference is made not only to a spatial environment, but also to a complete audio scene which is to be encoded/decoded before being rendered. The acoustic environment has its own spatial characteristics (e.g., positional data, such as vertex list and triangle list, either compressed or non-compressed), but also the properties of the materials which constitute the objected in the environment, and also the sound which may be virtually generated at an audio source localized in a particular position in the spatial environment, and which is virtually conditioned by the structural-acoustic data (positional data and properties of the acoustic materials) which are encountered in the spatial environment.

Structural-Acoustic Data Encoding Block

Figure 8:
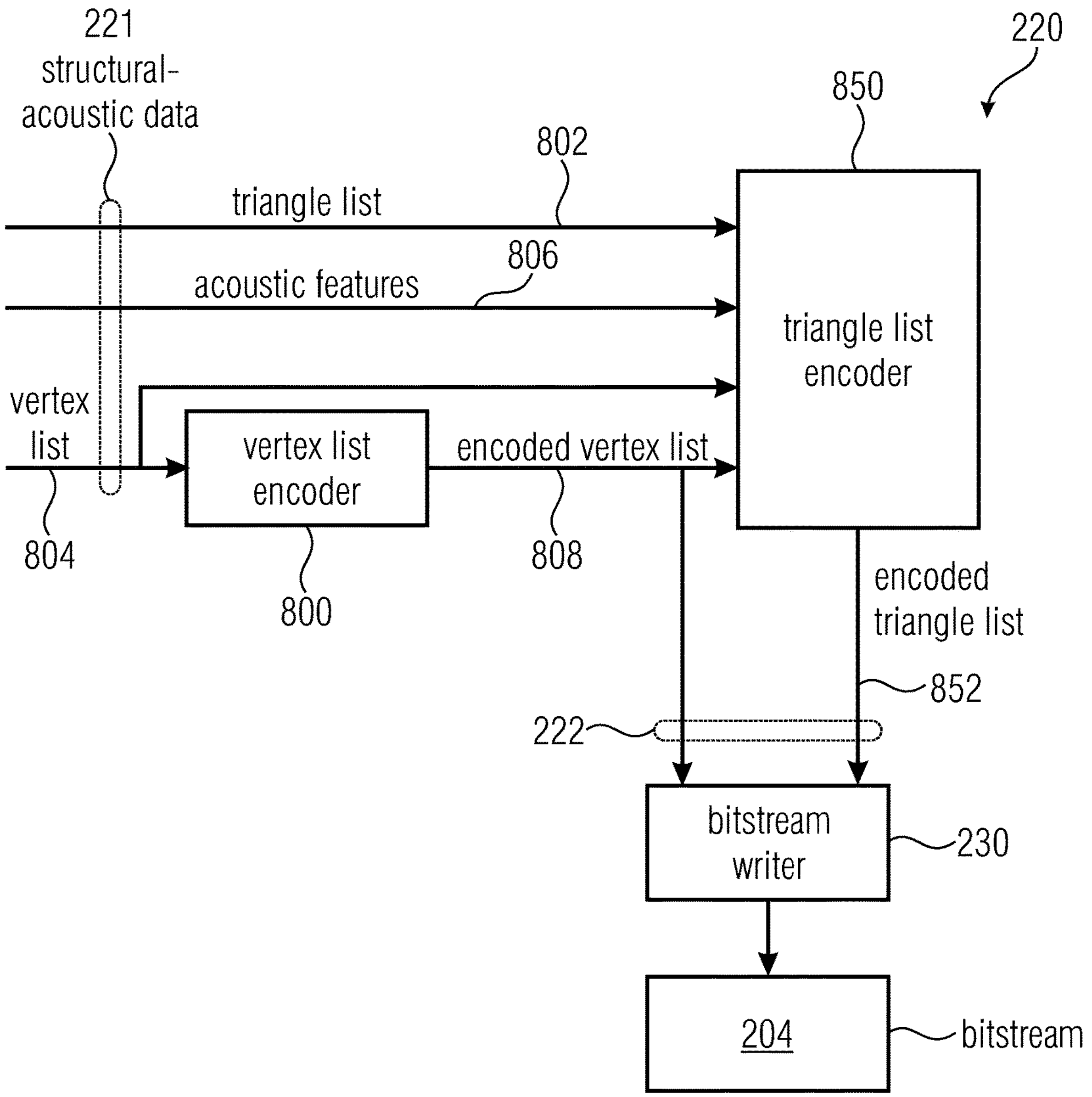
FIG. 8 shows an example of structural-acoustic data encoding block which may be a part of the encoder of FIG. 2.

FIG. 8 shows an example of the structural-acoustic data encoding block 220 of the encoder 200. As can be seen, the input to the structural-acoustic data encoding block 220 includes structural-acoustic data 221. The structural-acoustic data 221 may comprise, for example, a triangle list 802, a vertex list 804, and acoustic features 806. The acoustic features 806 may be part of the triangle list 802, but they are here shown differently for the sake of clarity.

The structural-acoustic data encoding block 220 may comprise a vertex list encoder 800, which may encode the vertex list 804 to obtain an encoded vertex list 808. It will be explained later how the encoder vertex list 808 may be generated.

The structural-acoustic data encoding block 220 may include a triangle list encoder 850. The triangle list encoder may be inputted by the triangle list 802 including the acoustic features 806, and the encoded vertex list 808 in the cases in which the encoded vertex list is provided in an encoded version or, as an alternative, by the vertex list 804 in a non-encoded version. Therefore, in some cases, it is not necessary that both the input 804 and 808 are provided to the triangle list encoder 850. The triangle list encoder 850 may provide an encoded triangle list 852 in which the triangle list 802 is compressed. Even though FIG. 8 is mainly discussed by using the word "triangle", the same result may be obtained by using different polygons.

Structural-Acoustic Data Encoding Block

Figure 9:
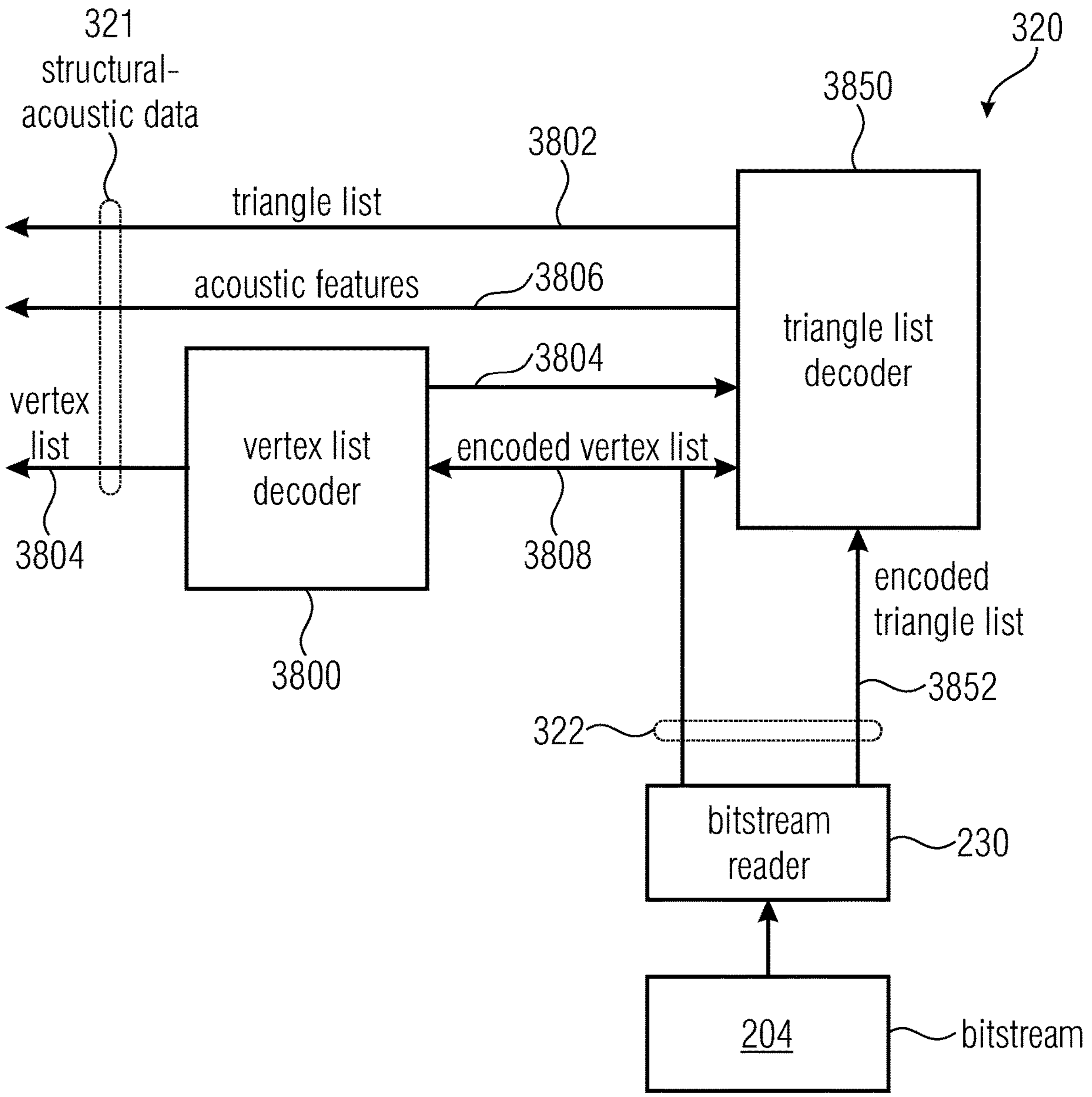
FIG. 9 shows an example of structural-acoustic data encoding block which may be a part of the decoder of FIG. 3.

FIG. 9 shows an example of the structural-acoustic data decoding block 320 of the decoder 300. From the bitstream 204, an encoded version of the structural-acoustic data 322 (which is the encoded version 222 of the structural-acoustic data as encoded by the encoder 200) is obtained. The bitstream reader 330 may provide an encoded version 3852 of the triangle list (which is a copy of the encoder triangle list 852 as encoded by the triangle list encoder 850) and an encoded version 3808 of the vertex list (which is a copy of the encoded vertex list 808 as encoded by the vertex list encoder 800). A triangle list decoder 3850 may be inputted by the encoder triangle list 3852. The vertex list decoder 3800 may be inputted by the encoded vertex list 3808, so as to provide a decoded vertex list 3804. The triangle list decoder 3850 may output a decoded triangle list 3802. The triangle list decoder 3850 may be inputted by either the encoded vertex list 3808 or by the vertex list 3804 as outputted by the vertex list decoder 3800. The structural-acoustic data 321 may therefore comprise the triangle list 3802 (including the acoustic features 3806) and the vertex list 3804. The triangle list 3802 may indicate, for each triangle, a vertex index taken from the vertex list 804 and 3804. Even though FIG. 9 is mainly discussed by using the word "triangle", the same result may be obtained by using different polygons.

Vertex Index Encoding and Decoding

It could be theoretically possible to simply encode all the coordinates of each vertex in the bitstream 204. For example, it could be possible to encode, for the primary vertex, all its x, y, z coordinates (110*ax*, 110*ay*, 110*az*); the same for the remaining vertexes 110*b* and 110*c* of the first triangle 110 and repeating all the fields also for the second triangle 120 (i.e., to represent all the x, y, z coordinates for the primary vertex 110*a* and for the remaining vertexes 120*bx* and 110*cx*). However, it has been understood that, in this way, a repetition of data fields would be caused. The fact, for example, that the coordinates of the primary vertex 110*a* (which is common to both the triangles 110 and 120) are repeated increases the length of the bitstream 204 and reduces efficiency.

Hence, it has been advantageous to adopt a technique according to which, for at least one dimension (x, y, z) (and in some examples for each dimension of the acoustic environment) it is possible to write the coordinate only once for a first triangle (e.g., 110), and by referring to at least one previously encoded coordinate when encoding at least one coordinate of a subsequent triangle (e.g., 120). In the example of FIG. 1, it is therefore advantageously possible to apply such a technique to each to the coordinates x, y, z of the main vertex 110*a* of the second triangle 120, and each of the coordinates x, y, z of the vertex 110*c* of the second triangle 120 (this is not possible for the coordinates of the vertex 120*b*, and their value shall be inserted in the bitstream 204). The technique may imply a reference, e.g. through a short code, to a previously encoded coordinate of a vertex. It will be shown that it is possible to store the already encoded coordinates in an ordered shortlist 450 (with instantiations 450*x*, 450*y*, 450*z* for the different dimensions), and to address them simply by encoding an ordered value (e.g. index) which is the ordered value which, in the shortlist 450, is associated with the previously encoded coordinate.

The example above may also apply to single coordinates of each vertex. For example, if a group of vertexes has the same x coordinate, or z coordinate, or y coordinate, they can be encoded by referring to the previous one (notably, the encoder may decide to decode them in closed succession, so that the stored coordinates are maintained in the shortlist, before the update). For example, the coordinate (whether x, y, or z) may be actually written in the bitstream 204 only for the first vertex, which is encoded, while the subsequent vertexes may be encoded by simply referring to the preceding encoded coordinate. For example, the y coordinates 110*ay* and 130*ay* of the vertex 110*a* (in the triangles 110 and 120) and of the vertex 130*a*, respectively, are the same (see FIG. 1); hence, it is advantageous to write in the bitstream 204 (and, before, in the encoded vertex list 808) the coordinate value 110*ay*, and to refer to it subsequently by encoding a value which is an order value in the ordered shortlist 450. Since encoder and decoder update the shortlist in the same way (in a replica-fashion), they share the knowledge of the values in the ordered shortlist 450 (and in its instantiations 450*x*, 450*y*, 450*z*). More in general, it has been understood that an ordered shortlist 450 in which coordinates of previously encoded vertexes are stored in association with an ordinal value 455 (instantiated by 455*x*, 455*y*, 455*z*).

FIG. 4 shows a first shortlist instantiation 450*x* for the x coordinate, a second shortlist 450*y* for the y coordinate, and a third shortlist 450*z* for the z coordinate. As can be seen, in the shortlist instantiation 450*x*, a first value (associated to the ordered value 0) is stored as 110*ax* since it is the x coordinate 110*ax* of the first processed vertex of the first triangle 110. In the second ordered value 1, there is stored the value 110*bx*, which refers to the x coordinate 110*bx* of the vertex 110*b* of the triangle 110. At the third ordered value 2 (third index) there is stored the value 110*cx* obtained from the x coordinate 110*cx* of the vertex 110*c* of the first triangle 110. In the fourth ordered value 3 (fourth index) there is written the x coordinate 120*bx* of the vertex 120*b* of the second triangle 120. This analogously will happen for the shortlist 450*y* and shortlist 450*z* for the y and z coordinates, respectively (there is an ordinal value for each of the shortlists, i.e. for each of the dimensions). It is to be noted that the ordered list 450 is replenished (stored) on the fly during the encoding of the bitstream 204 (or of the encoded version of the structural-acoustic data 422). In examples, the ordered shortlist 450 is replenished as long as the encoded version 222 of the structural-acoustic data 221 is generated. For example, when the x coordinate 110*ax* is written in the encoded version 222 of the structural-acoustic data 221 (and in particular in the encoded vertex list 808), the values 110*bx*, 110*cx*, 120*bx*, are still not present in the shortlist instantiation 450*x* for the x coordinate. Therefore, the ordered shortlist 450 (and in its instantiations 450*x*, 450*y*, 450*z*) is updated on the fly, while the encoded version 222 of the structural-acoustic data 221 is generated (and more in particular the encoded vertex list 808 is generated).

FIG. 4 also shows the encoding of vertex 130*a*. Since the y coordinate of the vertexes 110*a* and 130*a* are the same (but the x and z coordinates are not), the y coordinate of the vertexes is not repeated in the shortlist instantiation 450*y* for the y coordinate (and, indeed, the shortlist instantiation 450*y* has less coordinates stored therein as compared to the shortlist instantiations 450*x* and 450*z*). And, this is notwithstanding the fact that the same coordinate value 110*ay* is repeated in the y coordinates of both vertex 110*a* and 130*a*! Moreover, when encoding the version 222 of the structural-acoustic data 221 (or more in general when encoding the encoded version 808 of the vertex list 400, 804), it will be possible to base refer to the index 0 of the shortlist instantiation 450*y*, which has in general a shorter bitlength than longer codes.

FIG. 4 shows an example of the encoded version 222 of the structural-acoustic data 221 to be written in the bitstream 204 (and in particular of the encoded version 808, 3808 of the encoded vertex list). Each encoding of each vertex includes a mask 160 for each vertex, informing whether the coordinate values are actually encoded or only their reference through the ordered value (450) stored in the shortlist (450*x*, 450*y*, 450*z*) is encoded. The mask 160 is, in this case, represented as three binary values 160*x*, 160*y*, 160*z*, each indicating a binary information selecting between:

- the encoding of the coordinate of the vertex; and
- the encoding of the ordered value (index) from the ordered shortlist.

When the primary vertex 110*a* of the first triangle 110 is encoded, no other vertex has actually previously stored in the shortlist 450: this means that the shortlist 450 is void, and it is therefore not possible to refer to a position 455 of any previously encoded coordinate. Hence, all the binary values 160*x*, 160*y*, 160*z* of the mask 160 are 0 (it is here imagined that 0 means that the coordinates are to be encoded in the encoded version 222 of the structural-acoustic data 221, while the binary value 1 means that only the ordered value of the ordinate list 450 is encoded, but the binary values could have the opposite meaning in different examples). Subsequently, both the vertex index 403 is encoded (or another identifier of the vertex) and, in coordinate value data fields 170*c*, also the coordinate values 110*ax*, 110*ay*, 110*az* are encoded. The same is repeated for encoding the remaining vertexes 110*b*, 110*c*.

FIG. 4 also shows the encoding of vertex 130*a*. Since the y coordinates of the vertexes 110*a* and 130*a* are the same (but the x and z coordinates are not), it is not necessary to repeat the encoding of the y coordinate value of vertex 130*a*. As seen, its value 110*ay* is already stored in the first position of the instantiation 450*y* of the shortlist 450. For this reason, the ordered value 0 is inserted in the encoded version 222 of the structural-acoustic data 221 (or more in particular in the encoded version 808, 3808 of the encoded vertex list, and in the bitstream). As can be see, the mask 160 is 0 for the binary values 160*x* and 160*z*, but 1 for the binary value 160*y*. Indeed, subsequently an ordinal value data field 170*v* (carrying the ordered value 0, which is the ordered value of the referenced coordinate 110*ay* in the shortlist instantiation 450*y*) is encoded instead of the coordinate value in its length. As indicated by the binary values 160*x* and 160*z*, the coordinate values 130*ax* and 130*az* are not referenced through ordered values, but with the entire coordinate values, in coordinate value data fields 170*c*.

In examples, the vertex 110*a* is not encoded twice in the encoded version 222 of the structural-acoustic data 221 (or more in particular in the encoded version 808, 3808 of the encoded vertex list). Simply, the triangle list will refer to the same vertex 110*a* for both the triangles 110 and 120.

In general terms, for each coordinate of each vertex (primary vertex or remaining vertex), the structural-acoustic data encoding block 220 (and in particular the vertex list encoder 800) encodes: a value selected between

- the value of the coordinate; and
- the ordinal value (455*x*, 455*y*, 455*z*) of a previously encoded coordinate (and therefore previously encoded in the encoded version 222 to be written in the bitstream 204, or more in particular in the encoded version 808, 3808 of the encoded vertex list).

The choice between encoding the value coordinate and the ordinal value 455 (455*x*, 455*y*, 455*z*) can be made based on whether the previously encoded coordinate is in the shortlist 450.

Of course, if the second vertex of a triangle shares the same coordinate axis with another triangle (but is not coincident), then the binary values in the fields 160*x*, 160*y*, 160*z* of the mask 160 may be different (because may be one or two coordinates are to be actually encoded in the encoded version 122 of the structural-acoustic data 221) while at least one binary field shall be 1 (and it shall be indicated which ordered value in the encoded version 222 of the polygon data 221). This is the case of vertex 130*a*, which shares the same y coordinate with vertex 110*a*. For this reason, for each vertex, we may have some coordinates which may be written in the coded version 222 of the polygon data 221, while those that have already been written perfectly (and stored in the ordered shortlist 450) can simply be defined with ordinal values.

The shortlist 450 may be updated, e.g. in such a way that less frequent coordinate values are expelled from the shortlist 450 (e.g. by virtue of more frequent coordinate values being encoded). In addition or alternative, the shortlist 450 may be updated in such a way that the last coordinate values encoded in the bitstream 204 take over the previously encoded coordinate values. These techniques may be combined with each other: for example, a ranking may be established among the already encoded coordinates, the ranking being based on a score assigned to each already encoded coordinate based on a mixed criterion which encompasses both the frequency of the encoding of a coordinate (by increasing the score for the most frequent coordinate) and the freshness of the coordinate (by increasing the score for the last coordinate), so as to award the first positions in the shortlist 450 (associated with smaller bit-lengths) to those already encoded coordinates having higher score, and by excluding from the shortlist 450 the those already encoded coordinates having lower score, to the point of excluding those already encoded coordinates having minimal score.

It is also possible to encode different polygons (e.g. triangles) having vertexes which share the same coordinates in short succession from each other, so as to increase the probability that a coordinate is already present in the shortlist 450. More in general, it is possible to order the encoding of the structural-acoustic data 221 in such a way that polygons (e.g. triangles) having vertexes which share the same coordinates are encoded at steps closer than polygons (e.g. triangles) having vertexes which do not share the same coordinates. In examples, the ordering of the encoding may be chosen in such a way that the more the common coordinates are, the closer the encoding of the vertexes.

By virtue of the techniques above, those indexes (ordinal values) 450 which are mostly used are extremely reduced in dimension, implying that also the encoded version 222 of the structural-acoustic data 221 are compressed and the bitstream 204 is reduced in length.

It is to be noted that, here above, it has been imagined that the values in the ordered shortlist 450 are encoded on the fly, by subsequently updating the ordered shortlist. This may occur, for example, in case of streaming.

Therefore, the structural-acoustic data encoding block 220 may use, for at least one dimension (x, y, z) of the acoustic environment (or of the bounding box, see below), the ordered shortlist 450, in which coordinate values of previously encoded polygonal vertexes are stored according to an order (index, ordinal value 450). The structural-acoustic data encoding block 220 may, in case a coordinate value of one current main polygonal vertex or remaining polygonal vertex is the same of one coordinate value of one previously encoded main polygonal vertexes or remaining polygonal vertexes stored in the shortlist in a determined ordinal value, to encode the ordinal value of the shortlist 450. In case the coordinate value of one current polygonal is different of any coordinate value of one previously encoded main polygonal vertex or remaining vertex stored in the shortlist 450, then the coordinate value is encoded in the bitstream 204. In turn, the structural-acoustic data decoding block 320 of the encoder 200 may also use, for at least the same dimension, an ordered shortlist, in which coordinate values of previously decoded main polygonal vertexes or remaining polygonal vertexes are stored according to an order. The structural-acoustic data decoding block 320 may, in case the bitstream 204 has encoded therein a particular ordinal value of the shortlist, reconstruct the coordinate value as the value stored in the shortlist 450 associated with the ordinal value.

Basically, the shortlist 450 at the decoder 300 may be understood as a replica of the shortlist 450 at the encoder 200.

The structural-acoustic data encoding block 220 of the encoder 200 may encode, for at least one dimension (but advantageously for each of the three dimensions), the binary mask value (160*x*, 160*y*, 160*z*), indicating whether the coordinate value or the ordinal value in the shortlist is encoded (in the field 170*c* or 170*v*). In turn, the structural-acoustic data decoding block 320 of the decoder 300 may evaluate, for each vertex, the binary mask value 160 (160*x*, 160*y*, 160*z*) indicating whether the coordinate value or the ordinal value in the shortlist is encoded in the bitstream (204). Accordingly, the structural-acoustic data decoding block 320 may determine whether each coordinate is encoded as coordinate value or as index (ordinal value).

As explained above, if two vertexes have only one or two same coordinates (like the vertexes 130*a* and 110*a*), the encoding/decoding of the ordinal value (index) instead of the coordinate value will occur only for the same coordinates, while for the different one or two coordinates there will be independently encoded/decoded the coordinate value.

As explained above, the shortlist 450 may be divided in instantiations 450*x*, 450*y*, 450*z*, which can be independently treated. In examples, the structural-acoustic data encoding block 220 is configured so that:

- in case, for a first dimension, a coordinate value of one current vertex is the same of one coordinate value of one previously encoded vertex stored in the shortlist instantiation related to the first dimension in a determined ordinal value, to encode the ordinal value of the shortlist instantiation, and
- in case, for a second dimension, the coordinate value of the current vertex is different of any coordinate value of one previously encoded vertex stored in the shortlist instantiation related to the second dimension, to encode the coordinate value.

Analogously, at the decoder 300:

- in case, for a first dimension, a coordinate value of one current vertex is the same of one coordinate value of one previously decoded vertex stored in the shortlist instantiation related to the first dimension in a determined ordinal value (and this may be signalled in the bitstream 204, e.g. in one first of the binary values of the mask 160), to decode the ordinal value of the shortlist instantiation, and
- in case, for a second dimension, the coordinate value of the current vertex is different of any coordinate value of one previously decoded vertex stored in the shortlist instantiation related to the second dimension (and this may also be signalled in the bitstream 204, e.g. in one second of the binary values of the mask 160), to decode the coordinate value.

Triangle List Encoding/Decoding

Figure 6A:
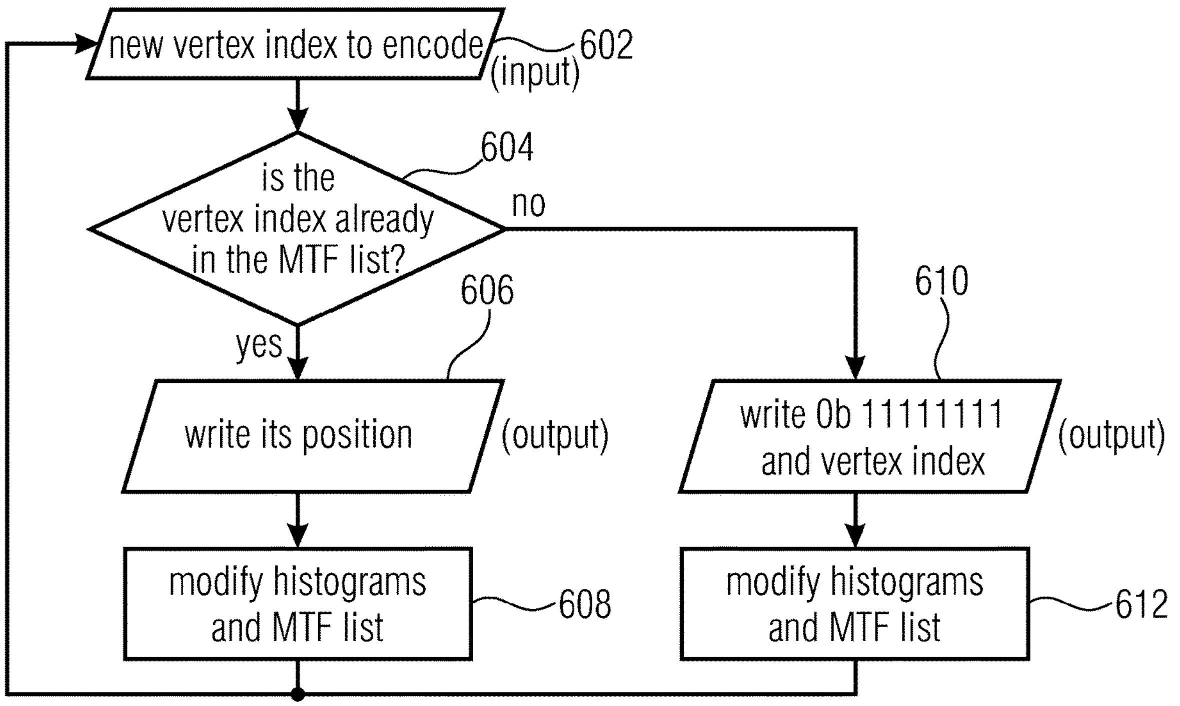
FIGS. 6*a* and 6*b* show examples of operations at the encoder and decoder, respectively, for encoding a triangle list.

FIG. 6*a* shows how to encode the encoding triangle list 852. As explained, each triangle is encoded by linking the vertex indexes of the vertexes from the vertex list (in compressed form 804, 3804, 400) and the acoustic features of the material. For each triangle, there may be encoded either the vertex index of the vertex from the vertex list in compressed form (808) or from an index in a second shortlist (also called here MTF, move to forward, list). The second shortlist (MTF list), which is explained in more detail later, contains vertex indexes, which have previously been used. If a vertex index is already in the second shortlist, then its position is encoded. Otherwise, the vertex index from the encoded vertex list 808 is written. The symbols associated with the different positions may be so that their bit length increases with the distance from the first position. An additional value (which may be longer than any other value of the second shortlist) may be encoded any time a vertex index is to be written instead of the position in the second shortlist. An example is provided in FIG. 6*a*. At step 602, a vertex to be written in the bitstream 204 is obtained. At step 604, it is evaluated whether the vertex index is already in the second shortlist (MTF list). If the vertex index is not in the second shortlist (MTF list), then a symbol (e.g., 0b11111111) is written in the bitstream and, subsequently, also the vertex index as taken from the encoded vertex list 808 or from the original vertex 804. At step 612, the second shortlist may be updated by writing the vertex index written in the bitstream (or more in general, in the encoded triangle list 852). Further, it is possible to modify the statistics of the occurrences of the vertex indexes, by modifying opportunely histograms associated to the vertex index. It is noted that the order of the steps 610 and 612 may be inverted or reversed. If at step 604 it is determined that the vertex index is already in the second shortlist (MTF list), then its position is written in the bitstream (or more in general, in the encoded list 852). Also in this case, the histograms and the MTF list may be modified at step 608. Also, the order of steps 606 and 608 may be inverted. Subsequently, a new vertex index may be encoded. It is to be noted that both the position and the vertex index may be encoded according to the so-called arithmetic coding, which requires histograms of the probability of each vertex index to be known both by the encoder and the decoder.

Figure 6B:
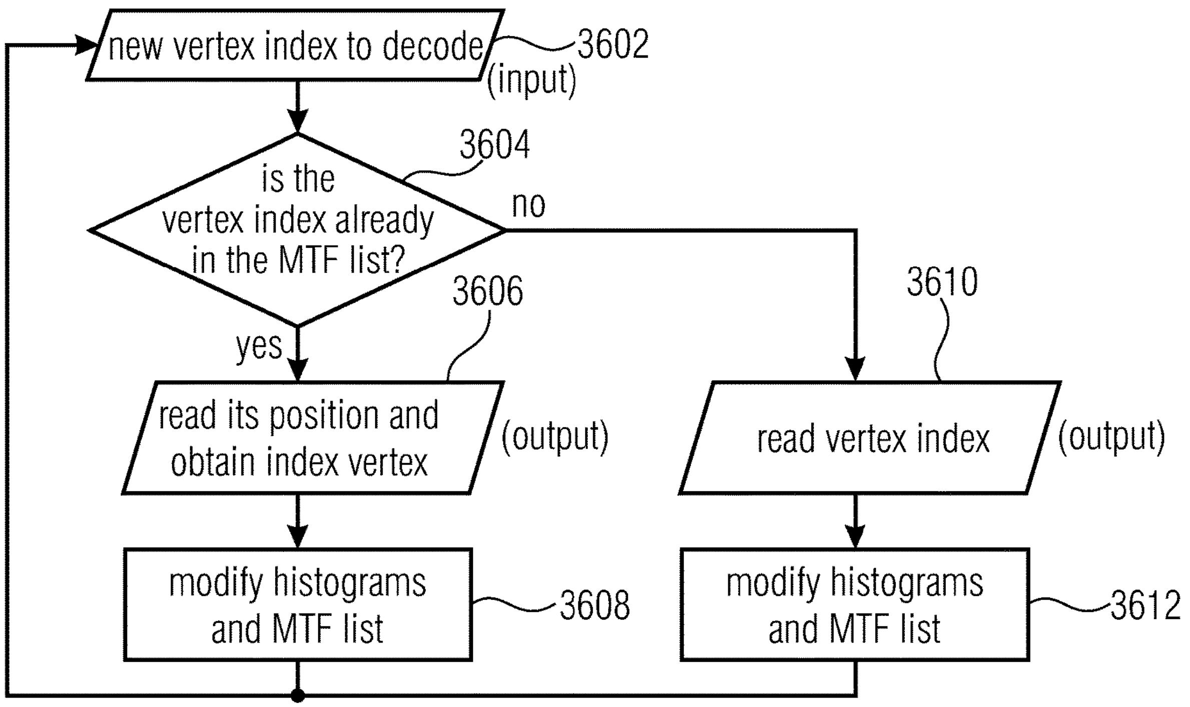

FIG. 6*b* shows an example of the triangle list decoding. At step 3602, a new vertex index is to be decoded. At step 3604, it is determined whether the vertex index is already in the MTF list or not. This may be determined, for example, by checking the in the bitstream. In the case of the bitstream having a symbol indicating that the vertex index is written in its entirety (and not its position from the second shortlist), then the steps 3610 and 3612 are invoked. At step 3610, the vertex index is read and written in the decoded version of the triangle list. At step 3612, the histograms and the MTF list are updated. In case the evaluation at step 3604 provides that the vertex index is already in the second shortlist (MFT list), then the steps 3606 and 3608 are invoked. In the step 3606, the position of an index vertex is read from the second shortlist (by point at the specific order value of the second shortlist) and its value is read from the shortlist. At step 3608, the histograms in the MTF list are modified. In steps 3608 and 3612, when the histograms are modified, it means that the probability of having the particular vertex index is increased. When it is referred that the MTF list is modified, it means that the vertex index is inserted in the first position (the one with the lowest position of the second shortlist). The steps 3606 and 3608 may be inverted with each other. The steps 3610 and 3612 may be inverted with each other.

Basically, both the encoder and the decoder comprise a second shortlist (MTF list), and the second shortlist of the decoder is understood to be a replica of the second shortlist of the encoder. Basically, the operations are the same, apart from the fact that in one case the encoded triangle list 852 is encoded and the other is decoded.

Figure 10A:
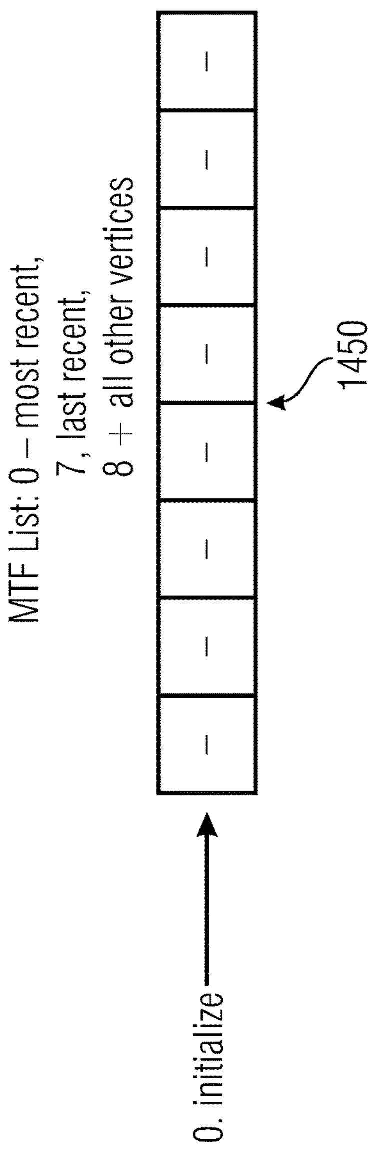
Figure 10B:
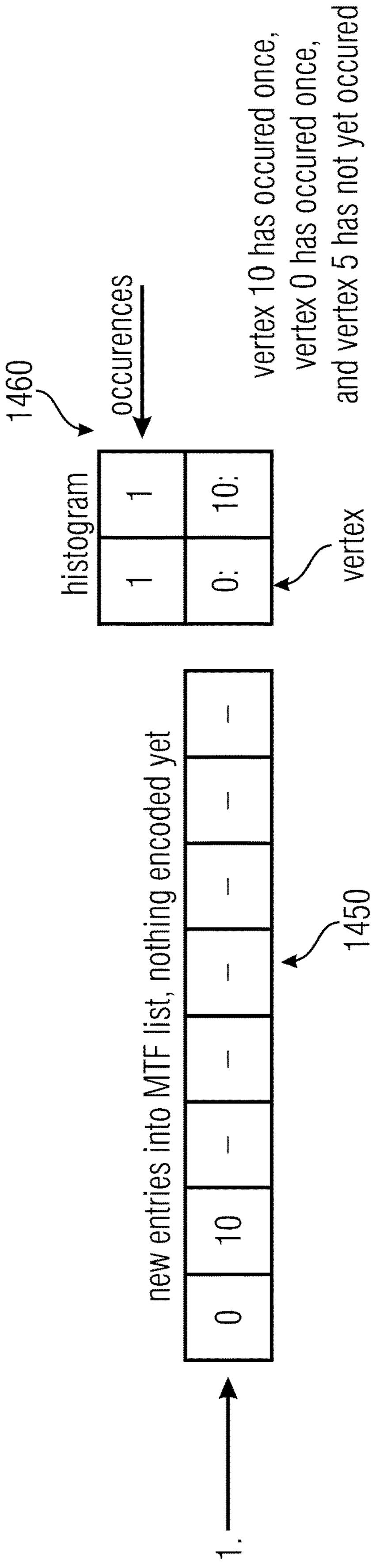
Figure 10C:
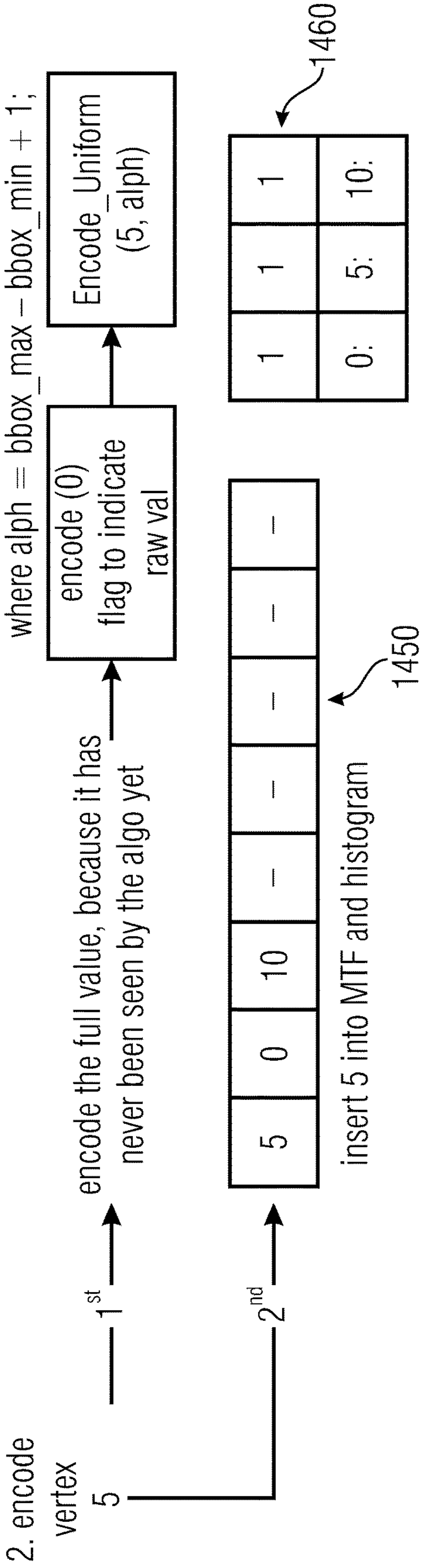
Figure 10D:
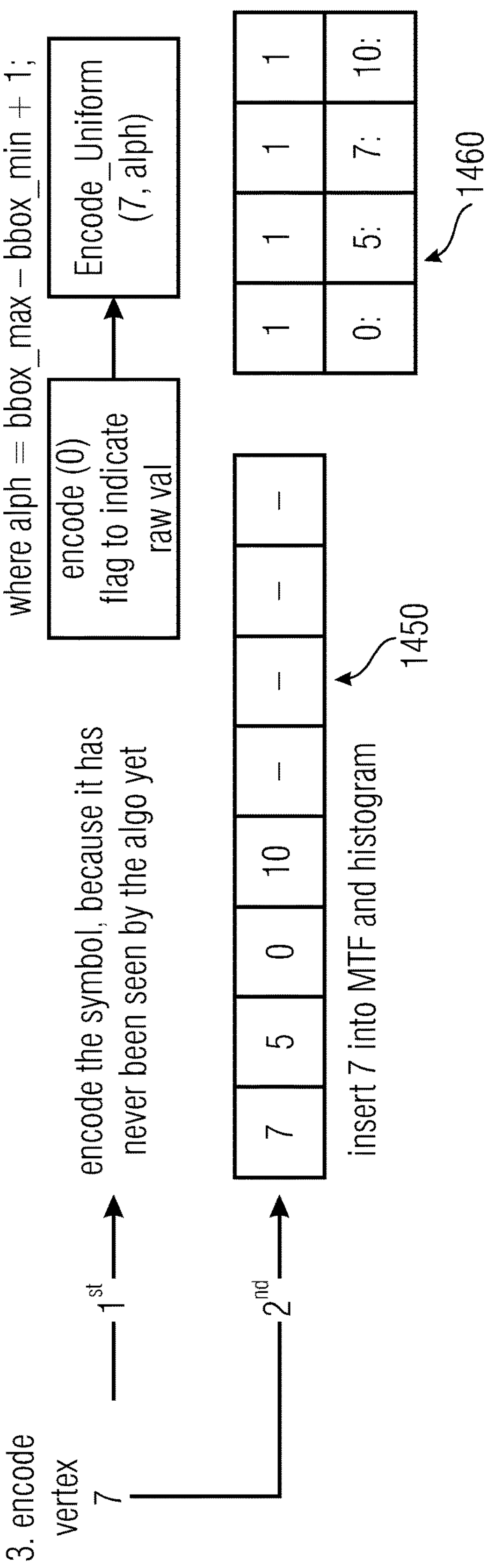
Figure 10E:
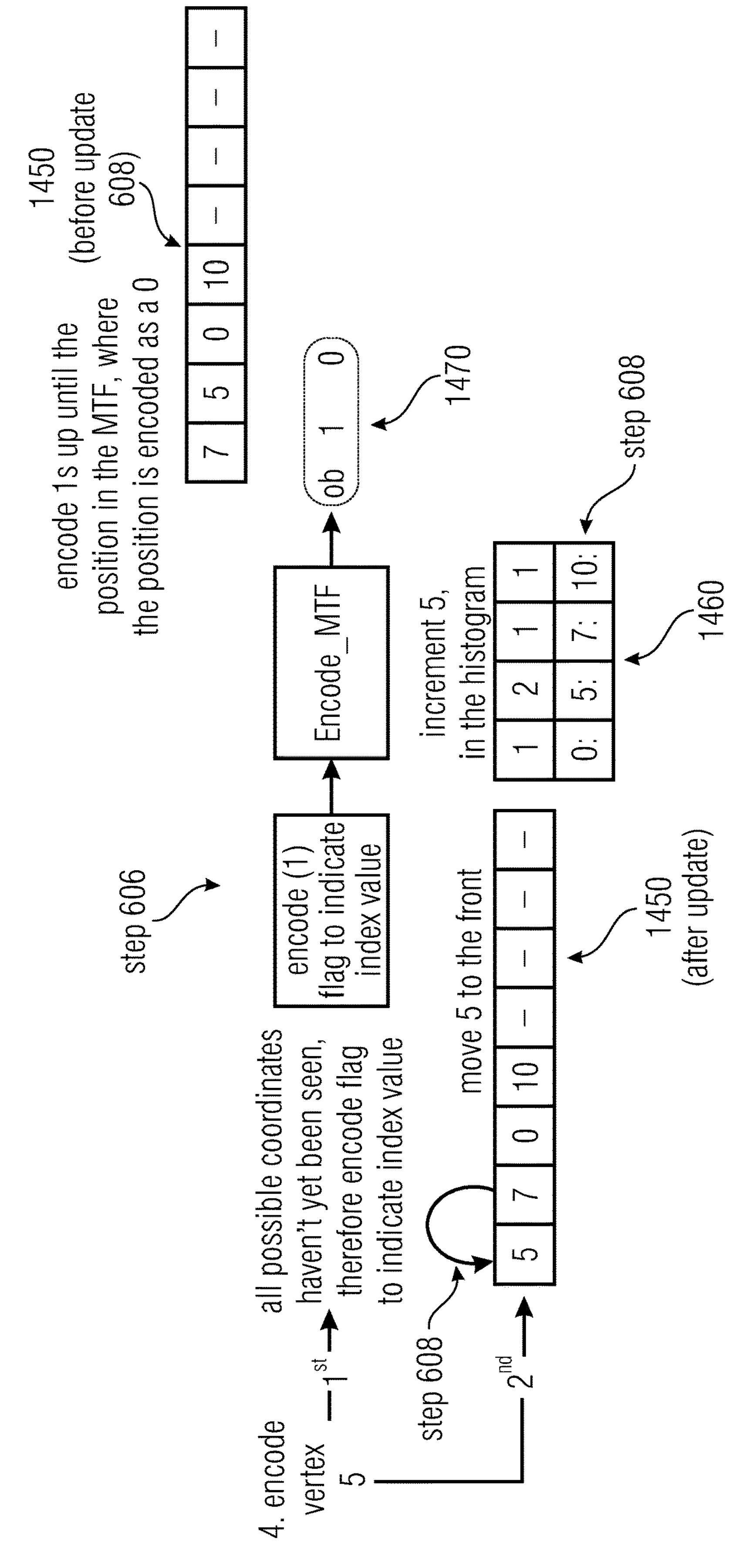
Figure 10F:
Figure 10G:
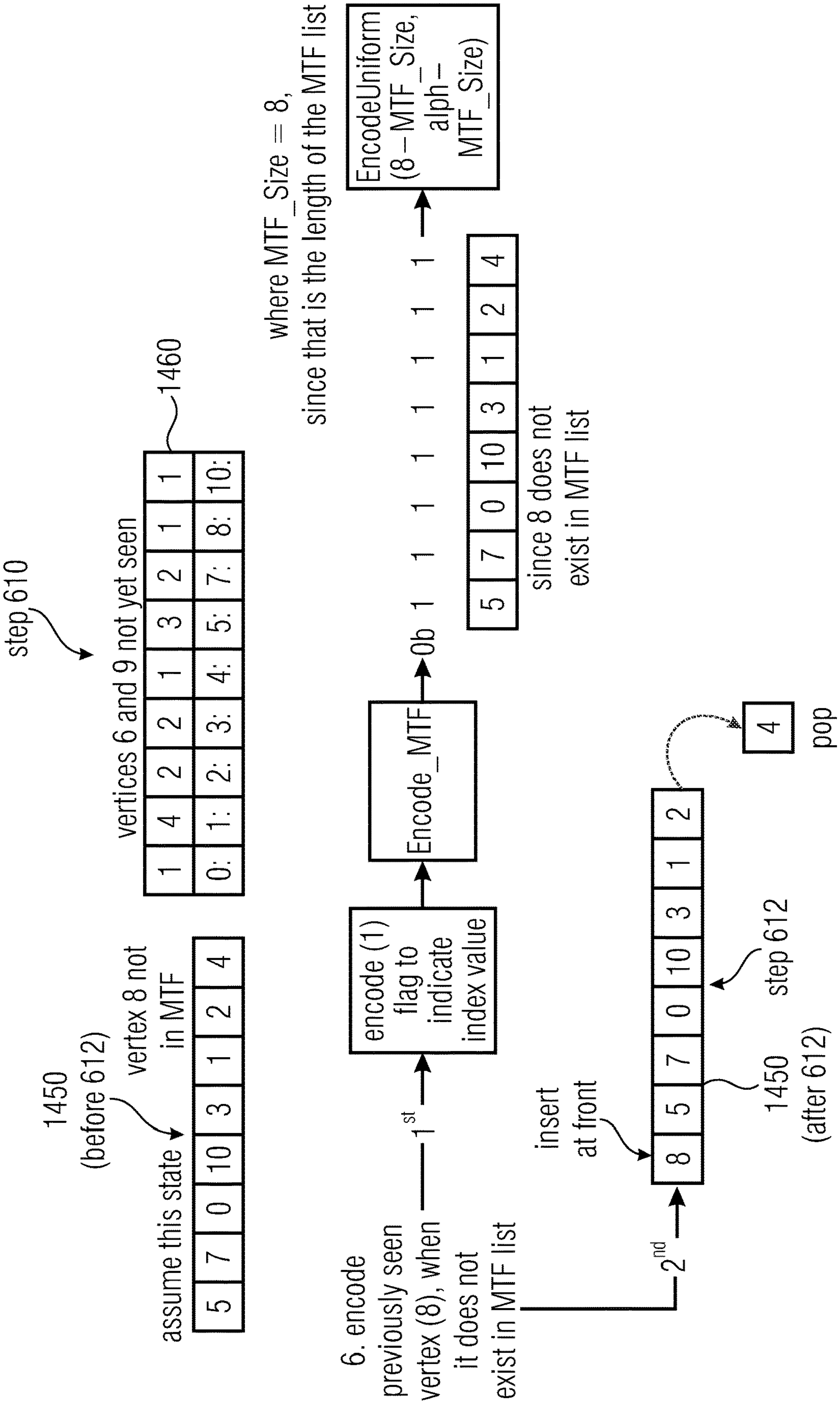

FIGS. 10*a*-10*g* show an example of operations at the triangle list encoder 850 (they can be easily adapted to the operations at the triangle list decoder 3850). Reference is made to the encoder only for clarity, but the same example may be reported for the decoder. In FIG. 10*a*, a step 0 of initialization is shown, in which the second shortlist (MTF list) 1450 is void of values. In FIG. 10*b* (step 1), first vertex indexes 0 and 10 are to be encoded. They are both the second shortlist 1450 and histograms 1460 are updated. In particular, the second shortlist 1450 has, in its first positions, the values 0 and 5, which are to be encoded. The histograms associate occurrences 1 for each of the values 0 and 6. The occurrences are to be understood as associated with the probabilities. In FIG. 10*c*, a vertex 5 is encoded. The second shortlist 1450 and the histograms 1460 are updated. As can be seen in the second shortlist 1450, the value takes the first position, while the values 0 and 10 are shifted towards less significant positions in the second shortlist. In FIG. 107, another vertex 7 is encoded. It is placed in the second shortlist 1450 and the histograms 1460 are updated. In FIG. 10*e*, the vertex 5 is to be written again. Accordingly, in the encoded version 852 of the triangle list (and subsequently in the bitstream 204), there is encoded the position 1470 (indicated with 0b10) of the value 5 (as can be seen, the value 5 is in the second position). At this point, also the vertex 5 takes the first position in the second shortlist (MTF list) 1450. It is to be noted that FIG. 10*e* substantially shows a step 606 of the method shown in FIG. 6*a*, since the position is written, with symbol 1470, as in step 606 of FIG. 6*a*. It is to be noted that the position that is taken is the second position as before the update of the second shortlist 1450 (step 608, which are indicated in FIG. 10*a*). FIG. 10*f* simply shows that other codes are encoded. FIG. 10*g* shows an example in which the vertex 8 shall be encoded, but 8 is not in the shortlist 1450 (the shortlist being full). This is an example of step 610 of FIG. 6*a*. In this case, the code 0b11111111 (or another code indicating the same situation) is encoded to indicate that a code is not in the second shortlist 1450. As can be seen, the second shortlist 1450 is updated by putting the value 8 at the first position, and by excluding (popping) the last value in the list.

FIG. 10*h* shows an example of codes associated with the position. As can be seen, the first position is associated with 0b0, which is the shortest code, while a final code 0b11111111 indicates that the position is not encoded, but the value of the vertex index is to be encoded. The same will apply to the decoder, but in that case, the encoded value is read and it is understood whether to search a particular vertex index from the second shortlist (MTF list) 1450 or whether the vertex index is encoded.

In any case, arithmetic coding may be used, in which shorter codes are assigned to more recurring index values to be encoded.

Bounding Box

It is possible to reduce the data length to be encoded in the encoded version 222 and/or in the bitstream 204 by intelligently changing the spatial coordinate system from an original spatial coordinate system to a coordinate system having advantageous peculiarities.

For example, it is possible to change the coordinate system to have the origin closer to the polygonal vertexes, therefore reducing the distances from the origin (and the length of the coordinates, as well). For example, it may be chosen to reduce the volume to be encoded to a bounding box in particular in the cases in which no vertex is excluded. In particular, a bounding box may be contained in the acoustic environment and the structural-acoustic data to be encoded in the bitstream 204 and/or in the version 222 are encoded with reference to a spatial coordinate system defined by one determined vertex of the bounding box.

Figure 5:
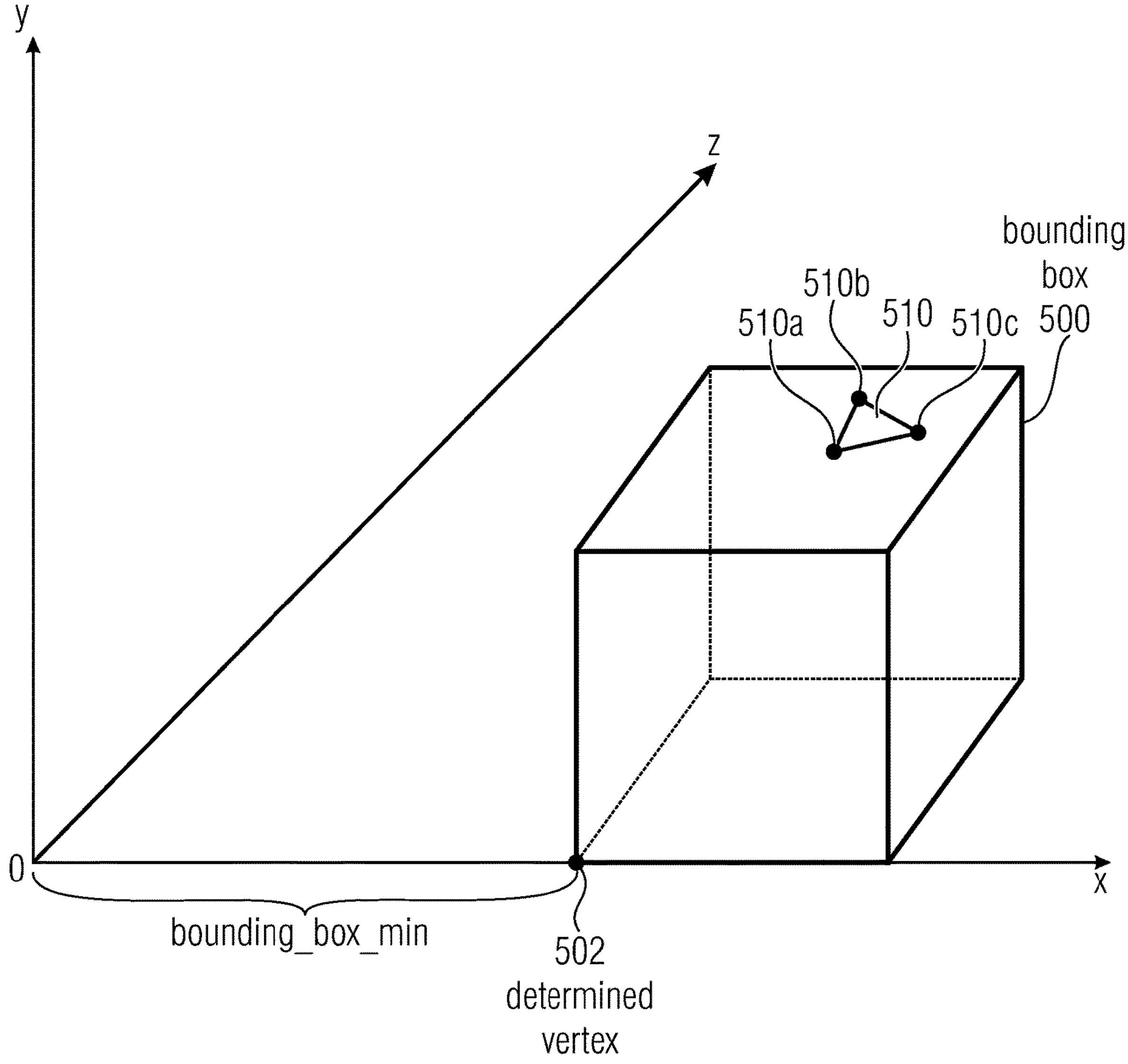
FIG. 5 shows an example of a bounding box.

An example of bounding box 500 is provided by FIG. 5. The bounding box may be a parallelepiped volume (or more in general a polyhedral volume) but in general terms may be exemplified as a prismatic volume (in particular with a rectangular base) and in some cases, it may be a cube. FIG. 5 shows a bounding box 500 and, just to show, a polygon 510 contained in the bounding box 500. The polygon 510 (triangle) as a primary vertex 510*a* and two remaining vertexes 510*b* and 510*c*. The polygon 510 is contained in the bounding box 500 (in general terms, it is the bounding box 500 which is chosen in such a way that all the polygons are contained). In FIG. 5 there is not shown any other triangle only for simplicity. The bounding box 500 may be signaled, e.g. by writing its positional features and/or orientation features. For example, there may be encoded the position of a determined vertex 502 (e.g. the one closer to the original origin of the coordinate system). In some cases, either the other vertexes of the bounding box 500 and/or an orientation information of the bounding box 500 may be encoded in teh bitstream. The shape and the orientation of the bounding box 500 is signaled univocally, so that the decoder can reconstruct the position of the vertexes 510*a*, 510*b*, 510*c* with respect to the bounding box and, in turn, in respect to the origin of the original axes. The bounding box 500 may also constitute a new spatial coordinate system by translation, rotation, or, more in general, roto-translation. In the simple case of FIG. 5, the coordinates along the dimensions y and z are maintained identical between the old coordinate system and the new coordinate system, but the x is shifted by an amount "bounding_box_min", caused by the shifting of the origin to correspond to the vertex 502 of the bounding box 500. This is advantageous in the case in which, in the interspace between the vertex 502 and the origin O of the original spatial coordinate system, there are no vertexes present. Hence, when the coordinates of the vertexes 510*a*, 510*b* and 510*c* of the polygon 510 are encoded (in the version 222 and/or in the bitstream 204), the bitlength of the coordinates in the x direction is reduced. Therefore, the bounding box 500 may be defined in such a way that it contains all the vertexes to be encoded, but reducing the space between the original origin of the coordinate system and the new origin of the coordinate system (which in this case corresponds to the vertex 502 of the bounding box 500). Basically, a change of the coordinate system is effected, in such a way of reducing the length of the coordinates to be encoded in the bitstream 204 and/or in the version 222 of the structural-acoustic data.

In addition or alternative, other kinds of optimizations may be performed, associated with the definition of the bounding box. For example, it is possible to evaluate possible recurring patterns. Were the acoustic environment presents at least one recurring pattern, it is possible to limit the bounding box to the at least one recurring pattern. The recurring pattern may be for example a symmetric pattern. For example, the symmetry could be radial symmetry or planar symmetry (other symmetries are possible). In case of symmetry (or more in general of a recurrent pattern) it is not necessary to encode all the vertexes of all the polygons, since it is possible to only encode the coordinates of the recurrent pattern (e.g. in the case of planar symmetry, of half of the symmetrical volume) so as to reduce the amount to of vertexes to be encoded in the bitstream 204. Basically, there may be defined the bounding box 500 so as to contain the recurring pattern once, without re-encoding the other recurring patterns (e.g. in the case of planar symmetry, it is not only necessary that the bounding box 500 contains the half of the symmetrical volume from the symmetry planar towards one of the two directions). Recurring pattern data are signaled in the bitstream 204 (e.g. in the case of planar symmetry, symmetry data are to be encoded so that the encoder 200 may reconstruct the shape of the represented acoustic object; e.g. in the case of a planar symmetry it is simply possible to provide information defining the symmetry plan, so that the decoder can reconstruct the final shape by reinserting the non-encoded half of the symmetric shape). The same can be performed in the case recurring patterns are periodical shapes: the bounding box may be limited to the shape which is periodically repeated, while the recurring pattern data may include the information which permits to reconstruct the final shape of the acoustic object by the decoder (e.g. including the spatial period, e.g. in the three dimensions, and so on). The same can also apply in the case of variable symmetry, according to which only an angular shape is defined, and recurring pattern data are signaled regarding the symmetry point and/or the symmetry radius, so that the decoder 300 can reconstruct the final radial symmetrical shape based on the symmetry data.

As will be apparent in the following passages, it is also possible to define a bounding block which, when the spatial coordinate system is changed onto the spatial coordinate system defined by the bounding box, the coordinates whose values have a greatest common divisor greater than 1 is maximized.

In examples, the audio source encoding block 210 of the encoder 200 may therefore define a bounding box contained in the acoustic environment and encode the structural-acoustic data within the bounding box, thereby refraining from writing structural-acoustic data in the regions outside the bounding box. The bounding box may exclude portions of the acoustic environment which do not contain any primary vertex and any remaining polygonal vertex. Information on the bounding box including positional data of the bounding box may be signalled in the bitstream 204 so as to permit the localization of the bounding box in the acoustic environment. The structural-acoustic data may be therefore subjected to a change of coordinate system onto a new coordinate system defined by the bounding box, and the coordinates of the vertexes of the polygons may therefore be encoded with reference to the new coordinate system defined by the bounding box. In turn, the audio source decoding block 310 of the decoder 300 may read, in the side information of the bitstream 204, the information on the bounding box, and in particular the positional data. Hence, the audio source decoding block 310 may localize the bounding box within the environment. Moreover, the audio source decoding block 310 may decode the structural-acoustic data within the bounding box, and, based on the localization performed through the positional data of the bounding box, the audio source decoding block 310 may reconstruct the positional data of the bounding box in the environment. The audio source decoding block 310 perform a change of coordinates form the coordinate system defined by the bounding box onto the original coordinate system of the environment, e.g. by performing the change of coordinates inverse with respect to that carried out at the encoder 200.

As explained above, the audio source encoding block 210 of the encoder 200 may also evaluate whether the acoustic environment presents at least one recurring pattern, and limit the bounding box to the at least one recurring pattern. Recurring pattern data may therefore be signaled in the bitstream 204. In this case, the audio source decoding block 310 of the decoder 300 may reconstruct the at least one acoustic object by applying a recurrence (e.g., by prolonging by symmetry, by periodicity, etc.) to the recurring pattern within the bounding box.

For example, the at least one recurring pattern may be a symmetric pattern (e.g. a plaraly symmetric pattern), and the recurring pattern data may therefore be symmetry data (e.g., the positional data indicating the position and/or the orientation of the symmetry plan) may be signalled in the bitstream 204. In turn, the audio source decoding block 310 of the decoder 300 may reconstruct the at least one object by symmetrically generating structural-acoustic data in positions symmetrical to the positions of the primary vertexes and the remaining polygonal vertexes in the bounding box (e.g. with respect to the symmetry plan).

Greatest Common Divisor

With or without the presence of the bounding box, in examples, the encoder may search for vertexes which have, at least in one coordinate, a common greatest common divisor. Hence, the encoder 200 is further configured to search, for a particular dimension of the acoustic environment to be encoded, and for a multiplicity of primary polygonal vertexes or remaining polygonal vertexes, at least one common divisor dividing the coordinates of the primary polygonal vertexes or remaining polygonal vertexes, to thereby encode a divided version of the coordinate value.

Let us consider, in FIG. 5, the x coordinate $x_a$ of the vertex 510*a* and the x coordinate $x_b$ of the vertex 510*b* (the coordinates $x_a$ and $x_b$ may have been discretized to be integer numbers, for example). If the coordinates $x_a$ and $x_b$ have a greatest common divisor $g>1$, then it is possible to factorize $x_a$ and $x_b$, so that $x_a=g*d_a$ and $x_b=g*d_b$ and, with both $d_a$ and $d_a$ integer, with $d_a<x_a$ and $d_b<x_b$, and with $g<x_a$ and $g<x_b$. Therefore, instead of encoding (in the encoded version 222 of the structural-acoustic data and/or in the bitstream 204) the big numbers (with high bitlength) $x_a$ and $x_b$, the small numbers (with low bitlength) g, $d_a$ and $d_b$ may be encoded. Accordingly, an appropriate reduction of the bitlength can be achieved, in particular when a greatest common divisor is retrieved for a multiplicity of coordinates of vertexes.

In examples, the audio source encoding block 210 of the encoder 200 may therefore search, for at least one dimension of the environment or of the bounding box, a common divisor, different from (greater than) 1, among the coordinates of a plurality of primary polygonal vertexes or remaining polygonal vertexes, to thereby encode in the bitstream 204 the common divisor and the results of the divisions of the coordinates by the common divisor. Hence, the bitstream 204 has encoded herein at least two coordinate values of at least two different vertexes in a factorized form according to a common divisor. This is signalled in the bitstream 204 (also the common divisor is encoded). In turn, the audio source decoding block 310 of the decoder 300 may reconstruct the at least two coordinate values encoded in factorized form by multiplying each of the at least two coordinate values by the common divisor, so as to reconstruct the at least two coordinate values.

In FIG. 4 there are shown the bitstream 204 to have coordinate value data fields 170*c* in which there are encoded the coordinate values, and ordinal value data fields 170*v* in which there are encoded the ordinal values of the shortlist 450. The value data fields 170*c* have in general a greater bitlength than the ordinal value data fields 170*v*.

Quantization

It is to be noted that the structural-acoustic data encoding block may preliminarily perform a quantization on the structural-acoustic data 221, eliminating duplicate vertexes and degenerate polygons. When this applies, the example discussed above (with reference to FIGS. 1 and 4) can basically be managed through the quantization.

Discussion

The new triangle mesh coding approach is composed of several stages, each contributing to improved efficiency. It is not strictly necessary to carry out all the stages together.

The first stage uniformly quantizes the vertex coordinates, using an encoder selectable quantization step and eliminates all duplicate vertexes and all duplicate and degenerate triangles. The second stage computes the bounding box for the entire list of vertexes. The third stage acts as a preprocessor, detecting implicitly reduced precision of coordinates, meaning all vertex coordinates are multiple of some integer number, separately on each dimension. The fourth stage takes advantage of geometries where a significant number of vertexes are located on common planes that are parallel with the coordinate axes. The fifth stage refines the fourth stage, by taking into account and creating a statistical model of the recency information of repeated coordinates, separately on each dimension. Each of these stages compute several model parameters for the best representation found by the encoder, which are coded very efficiently as side information together with the data itself using a range coder.

The first stage uniformly quantizes the vertex coordinates, using an encoder selectable quantization step. The quantization step is usually chosen to be small enough so that the quantization process does not introduce any acoustic artifacts, typically on the range from 1 mm to 2 cm. After quantization, all duplicate vertexes and all duplicate and degenerate triangles are eliminated. Depending on the generation algorithm for the triangle mesh, the same exact duplicate vertexes can potentially appear many times.

The second stage computes the exact bounding box for the entire list of vertexes, to exclude from coding any ranges that are not actually used. The bounding box is coded very efficiently, optimizing for some frequently encountered patterns. One frequent pattern is when a bounding box coordinate range is symmetric around zero, e.g., −150 and 150, where only the absolute value is coded once. This applies when the acoustic environment or object is symmetric with the respect to that coordinate. Another pattern is when a bounding box coordinate range has width zero, e.g. 150 and 150, where only one value is coded once. This applies when the acoustic object is completely flat.

The third stage acts as a preprocessor, detecting implicitly reduced precision of coordinates, meaning all vertex coordinates are multiples of some integer number, separately on each dimension. For example, if we assume that the quantization precision is set to 1 mm, and that all the X coordinates are actually expressed in multiples of 10 mm, then all the quantized X coordinates, and therefore all the quantized sizes on the X coordinate, are multiples of 10. Moreover, if the coordinates are made relative to the bounding box, complete translation invariance is achieved (e.g., all the sizes may be multiples of 10, but the coordinates may be all shifted with 1). These common multiples, when different from 1, can to be removed from the values to reduce the data range. The common multiples for each coordinate are coded very efficiently, optimizing for some frequently encountered patterns, like for a value of 1 (meaning no common multiple was found) and for a value exactly equal to the corresponding width of the bounding box (meaning there are exactly two different values present for that coordinate). Thus, a cube aligned to the coordinate axes will have, on each coordinate, as common multiple exactly the width of the bounding box of that each coordinate. Therefore, after preprocessing, for each coordinate, only values of 0 and 1 will remain.

The fourth stage takes advantage of geometries where a significant number of vertexes are located on common planes that are parallel with the coordinate axes. For example, if a number of vertexes are located on a plane parallel with the X and Y coordinate axes, this means that all the Z coordinate values of those vertexes are identical. The way to take advantage of repeating coordinate values, separately on each axis, is to code each coordinate value either as an index into a list of previously coded unique values, or as a new value coded explicitly, which will them be added to the list of previously coded unique values. Indicating which of the two ways a value is actually coded requires a “mask” bit, separately for each coordinate. These 3 “mask” bits per vertex are optimally coded using an adaptive binary probability estimator. If the number of distinct values for each coordinate is significantly smaller than the number of vertexes, then even with the overhead of the “mask” bits, the coded size is significantly smaller. The encoder can optimally decide, based only on the number of unique values for a coordinate and the number of vertexes if this representation is more efficient than the direct one.

The fifth stage refines the fourth stage, by taking into account and creating a statistical model of the recency information of repeated coordinates, separately on each dimension. The fourth stage would code for a repeating value its index into the list of previously coded unique values, using a uniform distribution. However, a significant proportion of repeating values map to indexes that were used very recently. Introducing a parameter representing the maximum number nr of recent index values to be remembered, a statistical model is created to code the last nr unique index values used more efficiently than all the others. A Move To Front (MTF) list of nr+1 entries is used to keep track of the values of the most recent nr index values, while the last entry represents all the other indexes. If an index value is found in the MTF list, its position in the list is coded, and that index value is moved to the beginning of the MTF list. Otherwise, the position nr in the list is coded, indicating that the index was not used recently, followed by the uniform coding of the index value itself. The positions in the MTF list are coded using an adaptive probability estimator, to match optimally the relative recency distribution. Increasing nr improves coding efficiency, however a small value of 8 for nr already achieves close to optimal results, allowing for a low complexity implementation.

Alternative Examples

It is to be mentioned here that all alternatives or aspects as discussed before and all aspects as defined by independent claims in the following claims can be used individually, i.e., without any other alternative or object than the contemplated alternative, object or independent claim. However, in other embodiments, two or more of the alternatives or the aspects or the independent claims can be combined with each other and, in other embodiments, all aspects, or alternatives and all independent claims can be combined to each other. An inventively encoded signal can be stored on a digital storage medium or a non-transitory storage medium or can be transmitted on a transmission medium such as a wireless transmission medium or a wired transmission medium such as the Internet.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An apparatus for decoding an acoustic environment, the acoustic environment comprising at least one audio source and at least one audio object, the at least one audio object being represented by a structural-acoustic data which links positional data of polygons with acoustic properties of acoustic materials, wherein the positional data comprises, for each polygon, the position of the vertexes, the apparatus comprising:

- a bitstream receiver for receiving, from the bitstream, an encoded version of structural-acoustic data and at least one audio stream to be rendered as generated by the at least one audio source in the acoustic environment;
- a processor configured to decode the at least one audio stream representing the at least one audio source,
- wherein the processor is configured to decode the structural-acoustic data,
- wherein the processor uses, for at least one dimension, an ordered shortlist, in which coordinate values of previously decoded vertexes are stored according to an order,
- wherein the process is configured, in case the bitstream has encoded therein an ordinal value of the ordered shortlist, to reconstruct the coordinate value as the value stored in the ordered shortlist associated with the ordinal value,
- the apparatus further comprising a renderer, to render an audio signal obtained from the at least one audio stream according to structural and positional relationships between the at least one source and the decoded structural-acoustic data.

2. The apparatus of claim 1, wherein the processor is configured to decode a vertex list indicating the positions of vertexes, each vertex comprising a vertex index.

3. The apparatus of claim 1, wherein the processor is configured to evaluate, for each vertex, a binary mask value indicating whether the coordinate value or the ordinal value in the ordered shortlist is encoded in the bitstream.

4. The apparatus of claim 1, wherein the processor is configured, based on signalling form the bitstream, to select between activating and deactivating the ordered shortlist for at least one dimension, to thereby deactivate the ordered shortlist.

5. The apparatus of claim 1, wherein the processor is configured to determine the multiplicity of coordinates of vertexes, so as to assign higher ranking ordered values and/or a lower-bit ordered values for coordinates with higher multiplicity.

6. The apparatus of claim 1, wherein the processor is configured to update the ordered shortlist on the fly, based on the coordinate values and/or the ordinal values decoded from the bitstream.

7. The apparatus of claim 1, wherein the ordered shortlist comprises one shortlist instantiation for each dimension.

8. The apparatus of claim 7, wherein the processor is configured:

- in case, for a first dimension, a coordinate value of one current vertex is the same of one coordinate value of one previously decoded vertex stored in the shortlist instantiation related to the first dimension in a determined ordinal value, to decode the ordinal value of the shortlist instantiation, and
- in case, for a second dimension, the coordinate value of the current vertex is different of any coordinate value of one previously decoded vertex stored in the shortlist instantiation related to the second dimension, to decode the coordinate value.

9. The apparatus of claim 1, wherein the processor is configured to decode structural-acoustic data using an arithmetic coding.

10. The apparatus of claim 1, wherein the processor uses, to decode at least one structural-acoustic data, a second shortlist, according to which the at least one structural-acoustic data is decoded from the position in the second shortlist.

11. The apparatus of claim 10, wherein the processor is configured so that, if the at least one structural-acoustic data is not in the second shortlist, the at least one structural-acoustic data is read in its entirety from the bitstream.

12. The apparatus of claim 10, wherein the particular code comprises higher bitlength than the codes used for indicating the position in the second shortlist.

13. The apparatus of claim 10, wherein the last decoded structural-acoustic data is positioned in the first position in the second shortlist, and the other decoded structural-acoustic in the second shortlist are shifted.

14. The apparatus of claim 10, wherein the codes indicating first positions in the second shortlist comprise lower bitlength than the codes indicating last positions in the second shortlist.

15. The apparatus of claim 10, wherein the processor uses the second shortlist for decoding a polygonal data list.

16. The apparatus of claim 15, wherein the processor uses the second shortlist for decoding a polygonal data list in which there is indicated the vertex indexes of the vertexes in a vertex list.

17. The apparatus of claim 1, wherein the processor is configured to read, signalled in the bitstream, information on a bounding box comprised in the acoustic environment, the information on the bounding box comprising positional data, to localize the bounding box within the environment, the apparatus being further configured to decode the structural-acoustic data within the bounding box.

18. The apparatus of claim 17, configured to reconstruct the position of each vertex based on the information on the bounding box comprising positional data.

19. The apparatus of claim 17, wherein the processor is configured so that, in case the bitstream signals that the acoustic environment presents at least one recurring pattern, to reconstruct the at least one acoustic object by applying a recurrence to a recurring pattern within the bounding box.

20. The apparatus of claim 19, wherein the processor is configured, in case the bitstream signals that the at least one recurring pattern is a symmetric pattern enclosed in the bounding box, to reconstruct the at least one object by symmetrically generating structural-acoustic data in positions symmetrical to the positions of the vertexes in the bounding box.

21. The apparatus of claim 20, wherein the symmetry is a planar symmetry, and the symmetry data signalled in the bitstream comprise information associated with the symmetry plan, wherein the apparatus is configured to reconstruct the at least one object by symmetrically generating structural-acoustic data in positions symmetrical to the positions of the vertexes in the bounding box with respect to the symmetry plan.

22. The apparatus of claim 17, wherein the processor is configured to perform a change of coordinates of the vertexes from a bounding box spatial coordinate system defined at least by one determined vertex of the bounding box onto an original coordinate system.

23. The apparatus of claim 1, wherein the processor is further configured, in case the bitstream signals that at least two coordinate values of at least two vertexes are encoded in a factorized form according to a common divisor, to multiply each of the at least two coordinate values encoded in the factorized form and the common divisor, so as to reconstruct the at least two coordinate values.

24. The apparatus of claim 23, wherein the common divisor is the greatest common divisor.

25. The apparatus of claim 1, wherein the polygons are triangles.

26. A method for decoding an acoustic environment, the acoustic environment comprising at least one audio source and at least one audio object, the at least one audio object being represented by a structural-acoustic data list which links positional data of polygons onto structural-acoustic properties of materials, wherein the positional data comprises, for each polygon, the position of one primary structural-acoustic vertex and the position of the remaining structural-acoustic vertexes, the method comprising:

receiving, from the bitstream, an encoded version of structural-acoustic data and at least one audio stream to be rendered as generated by the at least one audio source in the acoustic environment;

decoding the at least one audio stream; and decoding the structural-acoustic data, the method using, for at least one dimension, an ordered shortlist, in which coordinate values of previously decoded vertexes are stored according to an order, wherein, in case the bitstream has encoded therein an ordinal value of the ordered shortlist, to reconstruct the coordinate value as the value stored in the ordered shortlist associated with the ordinal value the method further comprising rendering an audio signal obtained from the at least one audio stream according to structural and positional relationships between the at least one source and the decoded structural-acoustic data.

* * * * *